United States Patent
Bingham et al.

(10) Patent No.: US 10,379,895 B2
(45) Date of Patent: *Aug. 13, 2019

(54) SYSTEMS AND METHODS FOR DETERMINING STATES OF USER-SELECTED PARENT COMPONENTS IN A MODIFIABLE, HIERARCHICAL COMPUTING ENVIRONMENT BASED ON PERFORMANCE STATES OF RELATED CHILD COMPONENTS

(71) Applicant: Splunk Inc., San Francisco, CA (US)

(72) Inventors: Brian Bingham, Denver, CO (US); Tristan Fletcher, Pacifica, CA (US)

(73) Assignee: Splunk Inc., San Francisco, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/675,538

(22) Filed: Aug. 11, 2017

(65) Prior Publication Data
US 2018/0032363 A1 Feb. 1, 2018

Related U.S. Application Data

(63) Continuation of application No. 15/139,210, filed on Apr. 26, 2016, now Pat. No. 9,733,974, which is a (Continued)

(51) Int. Cl.
*G06F 9/46* (2006.01)
*G06F 9/455* (2018.01)
(Continued)

(52) U.S. Cl.
CPC ...... *G06F 9/45558* (2013.01); *G06F 9/45533* (2013.01); *G06F 9/45545* (2013.01);
(Continued)

(58) Field of Classification Search
CPC ......... G06F 9/45558; G06F 2009/4557; G06F 2009/45591; G06F 2009/45595
See application file for complete search history.

(56) References Cited

U.S. PATENT DOCUMENTS 5,751,965 A 5/1998 Mayo et al.
6,725,235 B1 4/2004 Dyer et al.
(Continued)

FOREIGN PATENT DOCUMENTS

WO 2012020405 A1 2/2012

OTHER PUBLICATIONS

Butler, Brandon, "16 of the most useful cloud management tools," www.networkworld.com/article/2162241/cloud-computing/16-of-the-most-useful-cloud-management-tools.html, Dec. 17, 2012, 7 pages.
(Continued)

*Primary Examiner* — James J Lee
(74) *Attorney, Agent, or Firm* — Perkins Coie LLP

(57) ABSTRACT

Techniques promote monitoring of hypervisor systems by presenting dynamic representations of hypervisor architectures that include performance indicators. A reviewer can interact with the representation to progressively view select lower-level performance indicators. Higher level performance indicators can be determined based on lower level state assessments. A reviewer can also view historical performance metrics and indicators, which can aid in understanding which configuration changes or system usages may have led to sub-optimal performance.

20 Claims, 16 Drawing Sheets

Related U.S. Application Data continuation of application No. 14/609,335, filed on Jan. 29, 2015, now Pat. No. 9,323,557, which is a continuation of application No. 13/874,441, filed on Apr. 30, 2013, now Pat. No. 9,164,786.

(51) Int. Cl.
  *G06F 11/14* (2006.01)
  *G06F 11/34* (2006.01)
(52) U.S. Cl.
  CPC ...... *G06F 11/1484* (2013.01); *G06F 11/3409* (2013.01); *G06F 2009/4557* (2013.01); *G06F 2009/45591* (2013.01); *G06F 2009/45595* (2013.01)

(56) References Cited

U.S. PATENT DOCUMENTS

| | | |
|---|---|---|
| 7,123,172 B1 | 10/2006 | Ordentlich et al. |
| 7,546,553 B2 | 6/2009 | Bozak et al. |
| 7,580,944 B2 | 8/2009 | Zhuge et al. |
| 8,031,634 B1 | 10/2011 | Artzi et al. |
| 8,214,842 B2 | 7/2012 | Jaquet et al. |
| 8,412,696 B2 | 4/2013 | Zhang et al. |
| 8,516,008 B1 | 8/2013 | Sorkin et el. |
| 8,589,403 B2 | 11/2013 | Marquardt et al. |
| 8,683,467 B2 | 3/2014 | Bingham et al. |
| 8,683,474 B2 | 3/2014 | Yamamura et al. |
| 8,707,194 B1 | 4/2014 | Jenkins et al. |
| 8,738,333 B1 | 5/2014 | Smith et al. |
| 8,904,389 B2 | 12/2014 | Bingham et al. |
| 9,164,786 B2 | 10/2015 | Bingham et al. |
| 9,176,638 B2 | 11/2015 | Stringer et al. |
| 9,185,007 B2 | 11/2015 | Fletcher et al. |
| 9,323,557 B2 | 4/2016 | Bingham et al. |
| 9,426,045 B2 | 8/2016 | Fletcher et al. |
| 9,495,187 B2 | 11/2016 | Bingham et al. |
| 9,733,974 B2 | 8/2017 | Bingham et al. |
| 10,243,818 B2 | 3/2019 | Fletcher et al. |
| 2002/0154175 A1 | 10/2002 | Abello et al. |
| 2002/0186238 A1 | 12/2002 | Sylor et al. |
| 2004/0107369 A1 | 6/2004 | Cooper et al. |
| 2004/0133395 A1 | 7/2004 | Ding et al. |
| 2004/0169688 A1 | 9/2004 | Burdick et al. |
| 2005/0081157 A1 | 4/2005 | Clark et al. |
| 2006/0004909 A1 | 1/2006 | Takuwa et al. |
| 2006/0048101 A1 | 3/2006 | Krassovsky et al. |
| 2006/0153097 A1 | 7/2006 | Schultz et al. |
| 2006/0161816 A1 | 7/2006 | Gula et al. |
| 2006/0168272 A1 | 7/2006 | Rustad et al. |
| 2007/0130357 A1 | 6/2007 | Matsumoto et al. |
| 2008/0049641 A1 | 2/2008 | Edwards et al. |
| 2008/0092121 A1 | 4/2008 | DeRose et al. |
| 2008/0184110 A1 | 7/2008 | Barsness et al. |
| 2008/0215546 A1 | 9/2008 | Baum et al. |
| 2009/0013281 A1 | 1/2009 | Helfman et al. |
| 2009/0049372 A1 | 2/2009 | Goldberg et al. |
| 2009/0125530 A1 | 5/2009 | Martinsson et al. |
| 2009/0172666 A1 | 7/2009 | Yahalom et al. |
| 2009/0182866 A1 | 7/2009 | Watanabe et al. |
| 2010/0223619 A1 | 9/2010 | Jaquet et al. |
| 2010/0332661 A1 | 12/2010 | Tameshige et al. |
| 2011/0007075 A1 | 1/2011 | Lee et al. |
| 2011/0055817 A1 | 3/2011 | Noble et al. |
| 2011/0161851 A1 | 6/2011 | Barber et al. |
| 2011/0261055 A1 | 10/2011 | Wong et al. |
| 2011/0283278 A1 | 11/2011 | Murrell et al. |
| 2011/0307905 A1 | 12/2011 | Essey et al. |
| 2012/0023429 A1 | 1/2012 | Medhi et al. |
| 2012/0036484 A1 | 2/2012 | Zhang et al. |
| 2012/0054129 A1 | 3/2012 | Aggarwal et al. |
| 2012/0120078 A1 | 5/2012 | Hubbard et al. |
| 2012/0124503 A1 | 5/2012 | Coimbatore et al. |
| 2012/0174097 A1 | 7/2012 | Levin |
| 2012/0260135 A1 | 10/2012 | Beck et al. |
| 2012/0284713 A1 | 11/2012 | Ostermeyer et al. |
| 2012/0311475 A1 | 12/2012 | Wong |
| 2012/0324360 A1 | 12/2012 | Young et al. |
| 2013/0007261 A1 | 1/2013 | Dutta et al. |
| 2013/0055166 A1 | 2/2013 | Stinger et al. |
| 2013/0097183 A1 | 4/2013 | McCracken et al. |
| 2013/0104144 A1 | 4/2013 | Arcese et al. |
| 2013/0139160 A1 | 5/2013 | Yahalom et al. |
| 2013/0151692 A1 | 6/2013 | White |
| 2013/0174129 A1 | 7/2013 | Grammel et al. |
| 2013/0247043 A1 | 9/2013 | Bingham et al. |
| 2013/0275970 A1 | 10/2013 | Heim et al. |
| 2013/0297976 A1 | 11/2013 | McMillen |
| 2014/0047342 A1 | 2/2014 | Breternitz et al. |
| 2014/0059488 A1 | 2/2014 | El-Jayousi et al. |
| 2014/0114704 A1 | 4/2014 | Molinsky et al. |
| 2014/0201642 A1 | 7/2014 | Vicat-Blanc et al. |
| 2014/0280894 A1 | 9/2014 | Reynolds et al. |

OTHER PUBLICATIONS

VMware vCenter Operations Manager Documentation retrieved from vmware.com/support/pubs/vcops-pubs.html on Sep. 30, 2013, 2 pages.

Bitincka, Ledion et al., "Optimizing Data Analysis With a Semi-Structured Time Series Database," Proceedings of the 2010 Workshop on Managing Systems Via Log Analysis and Machine Learning Techniques, 9 pages, 2010.

Byron, Lee et al., "Stacked Graphs—Geometry & Aesthetics," IEEE Transactions on Visualization and Computer Graphics, vol. 14, No. 6, pp. 1245-1252, Nov./Dec. 2008.

Carasso, David, "Exploring Splunk—Search Processing Language (SPL) Primer and Cookbook," 156 pages, Apr. 2012.

VMware, Inc., vSphere Monitoring and Performance, Update 1, vSphere 5.5, EN-001357-02, 174 pages, 2014.

Foglight for Virtualization retrieved from quest.com/foglight-for-virtualization-free-edition/ on Sep. 30, 2013, 1 page.

VM-SYSTEM CONFIGURATION

Total VMs: 74
Total VM Migrations: 17
Total Hosts: 4

HOST STATUS

Storage Amounts

| Name | Committed | Capacity | Overprovisioned % |
|---|---|---|---|
| Host1 | 9.8 GB | 144.7 | -71.6 |
| Host2 | 159.2 | 224.3 | -29.0 |
| Host3 | 143.7 | 149.8 | 73.9 |
| Host4 | 75.0 | 149.8 | -39.61 |

VM ALARM HISTORY

| Time | Name | Message |
|---|---|---|
| 04/16 13:27 | VM1 | Memory alarm from gray to green |
| 04/16 14:01 | VM2 | CPU usage alarm from red to yellow |

FIG. 7A

SYSTEMS AND METHODS FOR DETERMINING STATES OF USER-SELECTED PARENT COMPONENTS IN A MODIFIABLE, HIERARCHICAL COMPUTING ENVIRONMENT BASED ON PERFORMANCE STATES OF RELATED CHILD COMPONENTS

RELATED APPLICATIONS

This application is a continuation application of, and hereby claims priority under 35 U.S.C. § 120 to, U.S. patent application Ser. No. 15/139,210, filed Apr. 26, 2016, now U.S. Pat. No. 9,733,974, which is a continuation of U.S. patent application Ser. No. 14/609,335, entitled "Determining Performance States for Parent Components in a Virtual-Machine Environment Based on Performance States of Related Child Components During a Time Period," by inventors Brian Bingham and Tristan Fletcher, filed on 29 Jan. 2015, now U.S. Pat. No. 9,323,557. U.S. patent application Ser. No. 14/609,335 is itself a continuation of U.S. patent application Ser. No. 13/874,441, entitled "Top-Down Performance Assessment of a Hypervisor," by inventors Brian Bingham and Tristan Fletcher, filed on 30 Apr. 2013, now U.S. Pat. No. 9,164,786. The above-listed applications are hereby incorporated by reference.

TECHNICAL FIELD

The present disclosure relates generally to computer-implemented systems and methods for automatically characterizing a performance of a hypervisor system.

BACKGROUND

Along with the advancement in computing technology, users' expectations of computational capabilities are similarly increasing. Users are constantly seeking resources that can provide the ability to achieve a computational result quickly and appropriately. Attending to users requests is complicated by the fact that user projects vary in terms of required processing power, memory allocation, software capabilities, rights licensing, etc. Recently, systems have been organized to include a plurality of virtual machines. Tasks can then be assigned to virtual machines based on the task requirements, the machines' capabilities and the system load. However, given the dynamic nature of assignments and the many components in these systems, monitoring the systems' performance is difficult.

SUMMARY

In accordance with the teachings provided herein, systems and methods for monitoring a hypervisor system are provided. A hypervisor system can coordinate operations of a set of virtual machines (VM) and/or hosts. Characterizing the overall operation of the system and/or operation of various system components can be complicated by the coordinated operation of the system components and the potential architecture flexibility of the system.

According to some embodiments, an architecture of a hypervisor structure is represented to a reviewer, along with indications characterizing how well individual components of the system are performing. In one instance, the architecture (which may be defined by an architecture provider and flexible in its structure) is represented as a tree with individual nodes corresponding to system components. For individual VMs, a performance number is calculated based on task completions and/or resource utilization of the VM, and a performance state is assigned to the component based on the number and state criteria. For higher level components (e.g., hosts, host clusters, and/or a Hypervisor), another performance number is calculated based on the states of the underlying components. A performance state is assigned to the higher-level components using different state criteria and the respective performance number.

A reviewer is presented with a performance indicator (which can include a performance statistic or state) of one or more high-level components. At this point, lower level architecture and/or corresponding performance indicators are hidden from the reviewer. The reviewer can then select a component and "drill down" into performance metrics of underlying components. That is, upon detecting a reviewer's selection of a component, low-level architecture beneath the selected component is presented along with corresponding performance indicators.

Particular embodiments of the subject matter described in this specification can be implemented to realize one or more of the following advantages. Techniques disclosed herein provide for the capability to characterize an operation of a hypervisor system at a variety of levels. By presenting the performance in a top-down manner, a reviewer can identify a level at which a system is experiencing problems and how an architecture may be modified to alleviate the problems. Further, by classifying different types of performance metrics (for various levels in the hierarchy) into one of a same set of states, a reviewer can easily understand how each portion of the system is performing.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures:

FIGS. 7A-7C further illustrate example detailed information that can be presented to characterize performance of a hypervisor system, a host and a VM, respectively;

Like reference numbers and designations in the various drawings indicate like elements.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
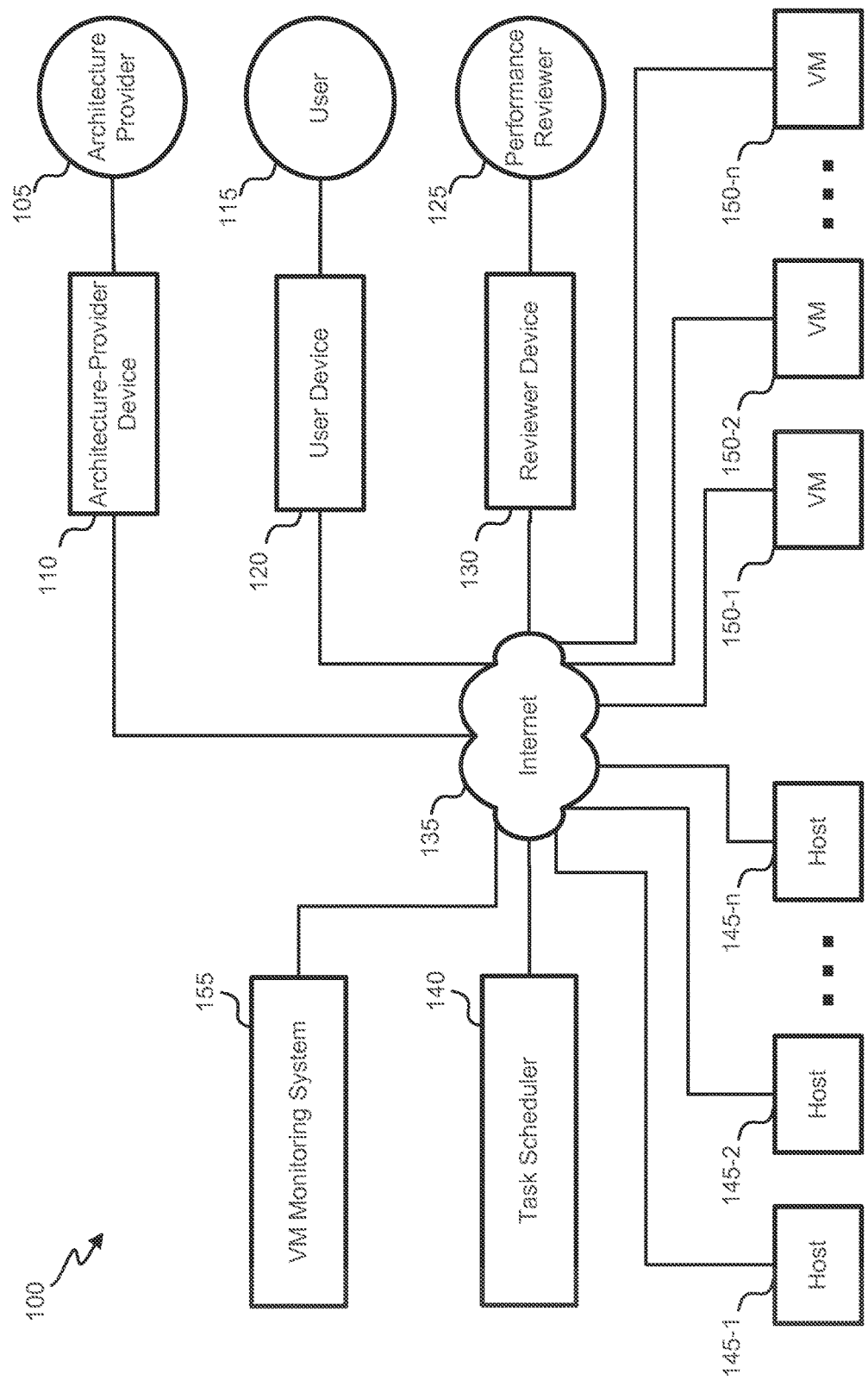
FIG. 1 shows a block diagram of an embodiment of a virtual-machine interaction system.

Referring first to FIG. 1, a block diagram of an embodiment of a virtual-machine interaction system 100 is shown. An architecture provider 105, user 115 and/or performance reviewer 125 can interact with a task scheduler 140 and/or virtual-machine (VM) monitoring system 155 via respective devices 110, 120 and/or 130 and a network 140, such as the Internet, a wide area network (WAN), local area network (LAN) or other backbone. In some embodiments, nexus publishing system 150 is made available to one or more of architecture provider 105, user 115 and/or performance reviewer 125 via an app (that can be downloaded to and executed on a portable electronic device) or a website. It will be understood that, although only one architecture provider 105, user 115 and/or performance reviewer 125 are shown, system 100 can include multiple architecture providers 105, users 115 and/or performance reviewers 125.

Architecture-provider device 110, user device 120 and/or reviewer device 130 can each be a single electronic device, such as a hand-held electronic device (e.g., a smartphone). It will be understood that architecture-provider device 110, user device 120 and/or reviewer device 130 can also include a system that includes multiple devices and/or components. The device(s) 110, 120 and/or 130 can comprise a computer, such as the desktop computer, a laptop computer or a tablet. In some instances, a party 105, 115 and/or 125 uses different devices at different times to interact with task scheduler 140 and/or VM monitoring system 155.

An architecture provider 105 can communicate with VM monitoring system 155 to provide input defining at least part of an architecture that sets forth a structure of a Hypervisor. The input can include identification of components of the Hypervisor, such as VMs, hosts or host clusters. The input can also include identification of relationships between system components, which can include parent-child relationships. For example, a host can be identified as being a parent of five specific VMs. In some instances, identifying the relationships includes defining a hierarchy.

Architecture provider 105 can identify characteristics of particular hypervisor components, such as a CPU count, CPU type, memory size, operating system, name, an address, an identifier, a physical location and/or available software. The architecture can also identify restrictions and/or rules applicable to VM-system components. For example, select resources may be reserved such that they can only be assigned high-priority tasks or tasks from particular users. As another example, architecture provider 105 can identify that particular resources are only to be assigned tasks of a particular type or that all tasks of a particular type are to be assigned to a particular resource.

The input can include text entered into a field, an uploaded file, arrangement and/or selection of visual icons, etc. Defining the architecture can include defining a new structure or modifying an existing structure.

Based on the architecture, a task scheduler 140 can utilize a set of hosts 145 and/or VMs 150 to complete computational tasks. In some instances, task scheduler 140 assigns tasks to a host 145 and/or VM 150 (e.g., the host providing computing resources that support the VM operation and the VM being an independent instance of an OA and software). The VM can then, e.g., store data, perform processing and/or generate data. Task scheduler 140 can monitor loads on various system components and adjust assignments accordingly. Further, the assignments can be identified to be in accordance with applicable rules and/or restrictions.

Figure 2:
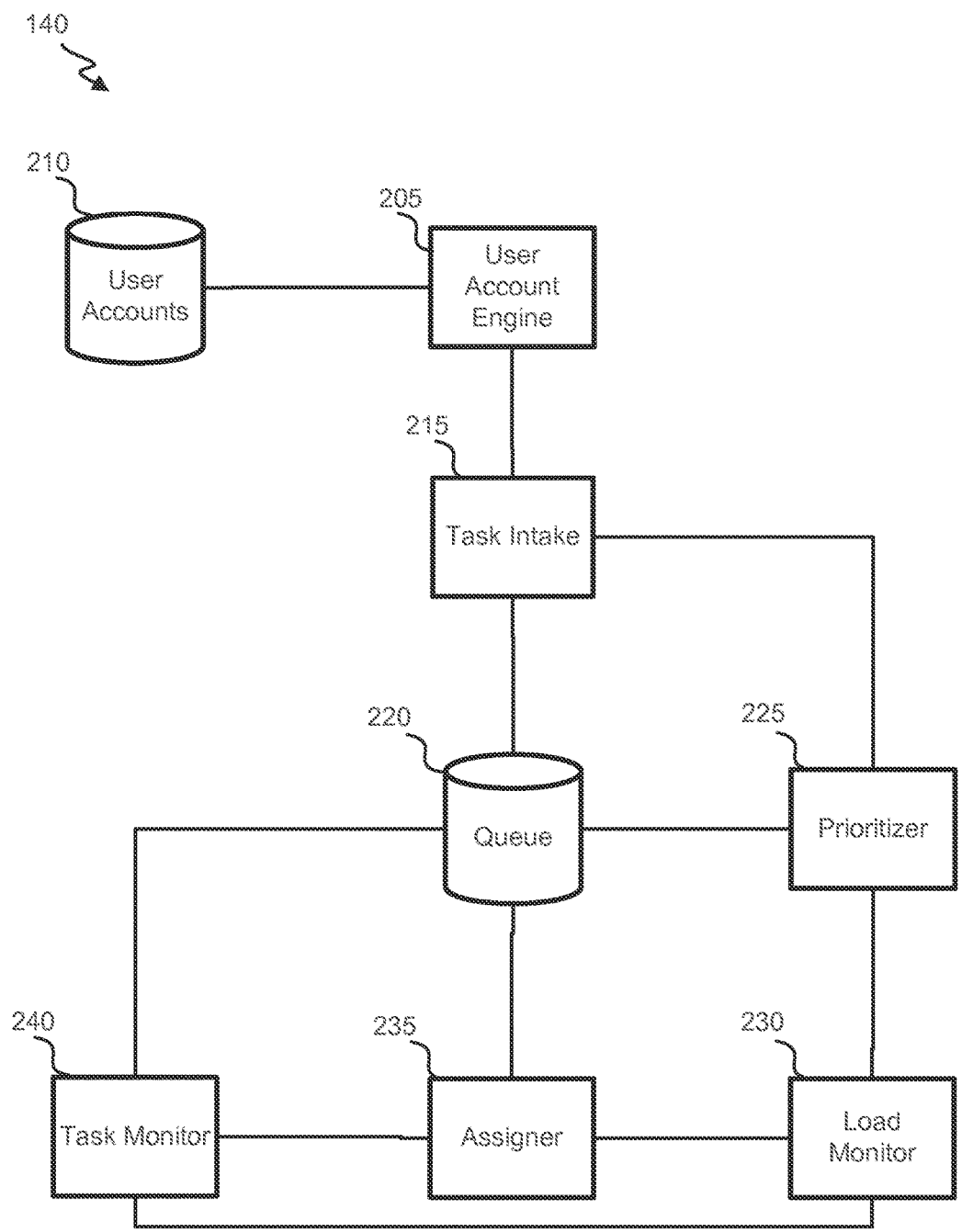
FIG. 2 shows a block diagram of an embodiment of task assigner.

A VM monitoring system 155 can monitor applicable architecture, task assignments, task-performance characteristics and resource states. For example, VM monitoring system 155 can monitor: task completion time, a percentage of assigned tasks that were completed, a resource power state, a CPU usage, a memory usage and/or network usage. VM monitoring system 155 can use the monitored performance metrics to determine performance indicators (as described further below) to present to a reviewer 125. Reviewer 125 can interact with an interface provided by VM monitoring system 155 to control which performance indicators are presented. For example, reviewer 125 can specify a type of performance indicator (e.g., by defining a set of performance states) or can specify specific components, component types or levels for which the indicators are presented Referring next to FIG. 2, a block diagram of an embodiment of task assigner 140 is shown. Task assigner 140 can be, in part or in its entirety, in a cloud. Task assigner 140 includes a user account engine 205 that authenticates a user 115 attempting to access a Hypervisor. User account engine 205 can collect information about user 115 and store the information in an account in a user-account database 210. The account can identify, e.g., a user's name, position, employer, subscription level, phone number, email, access level to the Hypervisor and/or login information (e.g., a username and password). Information can be automatically detected, provided by user 115, provided by an architecture provider 105 (e.g., to specify which users can have access to a system defined by a provided architecture) and/or provided by a reviewer 125 (e.g., who may be identifying employees within a company or organization who are to be allowed to access the Hypervisor).

In some instances, user account engine 205 determines whether a user 105 is authorized to access the system by requesting login information (e.g., a username and password) from user 115 and attempting to match entered login information to that of an account stored in user-account database 210. In some instances, user account engine 205 determines whether user 115 is authorized by comparing automatically detected properties (e.g., an IP address and/or a characteristic of user device 120) to comparable properties stored in an account. User account engine 205 can further, in some instances, determine which Hypervisors and/or which hypervisor components user 115 is authorized to use (e.g., based on a user-provided code or stored information identifying access permissions).

Authorized users can then be granted access to a task intake 215, which receives a task definition from user 115. User 115 can define a task by, e.g., uploading a program code, entering a program code, defining task properties (e.g., a processing to be done, a location of data to be processed, and/or a destination for processed data), or defining task restrictions or preferences (e.g., requirements of resources to be used or task-completion deadlines). In some instances, defining a task includes uploading data to be processed. In some instances, a task is defined by executing a code provided by user 115 and defining portions of the codes (e.g., during specific iterations) as distinct tasks. Task intake 215 can verify that the task definition is acceptable (e.g., being of an appropriate format, having restrictions that can be met and being estimated to occupy an acceptable amount of resources). This verification can include fixed assessments and/or assessments that are specific to user 115 or a user group.

Upon determining that the task definition is acceptable, task intake 215 generates a queue entry. The queue entry can include an identifier of the task, a characteristic of the task (e.g., required resource capabilities, estimated processing time, and/or estimated memory use), an identification of user 115, a characteristic of user 115 (e.g., an employer, a position, a level-of-service, or resources which can be used) and/or when the task was received. In some instances, the queue entry includes the task definition, while in other instances, the queue entry references a location (e.g., of and/or in another database) of the task definition.

A prioritizer 225 can prioritize the task based on, e.g., a characteristic of the task, a characteristic of user 115 and/or when the task was received (e.g., where either new or old tasks are prioritized, depending on the embodiment). Prioritizer 225 can also or alternatively prioritize the task based on global, company-specific or user-specific usage of part or all of Hypervisor. For example, if many queue items require that a processing VM be running Operating System (OS) #1 (and/or if few resources run the OS), prioritizer 225 may prioritize queue items permissive of or requiring a different OS being run. Similarly, prioritizations can depend on a current load on part or all of a Hypervisor. For example, tasks that can be assigned to a VM currently having a small CPU usage can be assigned high priority. Thus, a load monitor 230 can communicate with prioritizer 225 to identify a load (e.g., a processing and/or memory load) on specific resources and/or specific types of resources.

Prioritizing a task can include assigning a score (e.g., a numeric or categorical score) to the task, which may include identifying some tasks which are "high" priority. Prioritizing a task can include ranking the task relative to tasks. The prioritization of a task can be performed once or it can be repeatedly performed (e.g., at regular intervals or upon having received a specific number of new tasks). The prioritization can be performed before, while or after a queue item identifying the task is added to the queue. The queue item can then be generated or modified to reflect the prioritization.

An assigner 235 can select a queue entry (defining a task) from queue 220 and assign it to one or more resources (e.g., a host cluster, a host and/or a VM). The selection can be based on a prioritization of queue entries in queue 220 (e.g., such that a highest priority task is selected). The selection can also or alternatively depend on real-time system loads. For example, load monitor 230 can identify to assigner 235 that a particular VM recently completed a task or had low CPU usage. Assigner 235 can then select a queue entry identifying a task that can be performed by the particular VM. The assignment can include a pseudo-random element, depend on task requirements or preferences and/or depend on loads of various system components. For example, assigner 235 can determine that five VMs have a CPU usage below a threshold, can determine that three of the five have capabilities aligned with a given task, and can then assign the task to one of the three VMs based on a pseudo-random selection between the three. The assignment can further and/or alternatively reflect which Hypervisors and/or system components a user from whom a task originated is allowed to access. Assigner 235 can update queue 220 to reflect the fact that a task is/was assigned an to identify the assigned resource(s).

A task monitor 240 can then monitor performance of the tasks and operation states (e.g., processing usage, CPU usage, etc.) of assigned resources. Task monitor 240 can update queue 220 reflect performance and/or resource-operation states. In some instances, if a performance state and/or resource-operation state is unsatisfactory (e.g., is not sufficiently progressing), assigner 235 can reassign the task.

Figure 3:
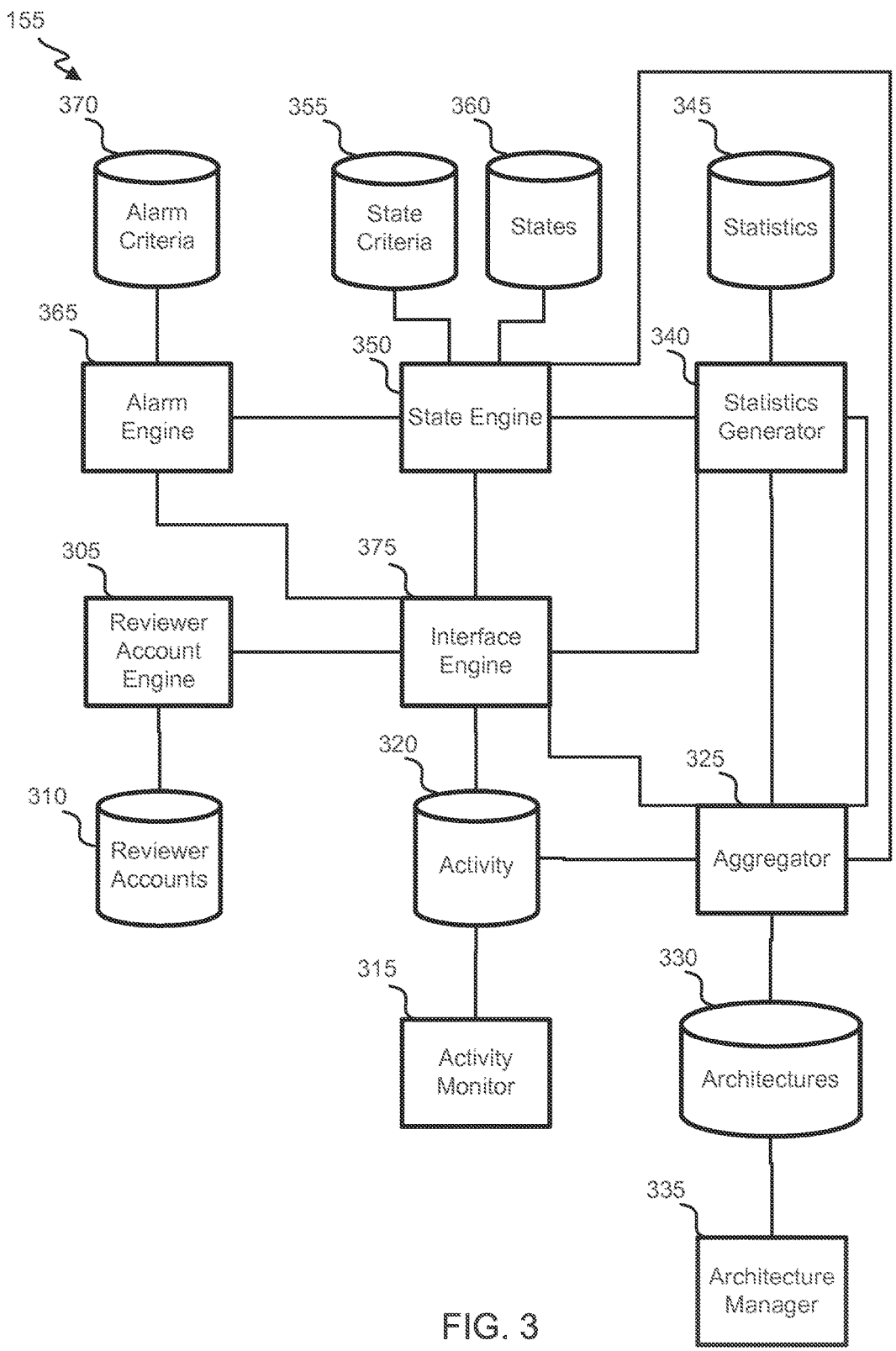
FIG. 3 shows a block diagram of an embodiment of a VM monitoring system.

Referring next to FIG. 3, a block diagram of an embodiment of VM monitoring system 155 is shown. VM monitoring system 155 can be, in part or in its entirety, in a cloud. VM monitoring system 155 includes a reviewer account engine 305, which authenticates a reviewer attempting to access information characterizing performance of a Hypervisor. Reviewer account engine 305 can operate similarly to user account engine 205. For example, reviewer account engine 305 can generate reviewer accounts stored in a reviewer-account database 310 where the account includes information such as the reviewer's name, employer, level-of-service, which Hypervisors/components can be reviewed, a level of permissible detail for reviews, and/or login information. Reviewer account engine 305 can then determine whether detected or reviewer-entered information (e.g., login information) matches corresponding information in an account.

VM monitoring system 155 also includes an activity monitor 315, which monitors activity of hypervisor components. The activity can include, for example, when tasks were assigned, whether tasks were completed, when tasks were completed, what tasks were assigned (e.g., required processing), users that requested the task performance, whether the task was a new task or transferred from another component (in which case a source component and/or transfer time can be included in the activity), CPU usage, memory usage, characteristics of any memory swapping or ballooning (e.g., whether it occurred, when it occurred, an amount of memory, and the other component(s) involved), and/or any errors.

Activity monitor 315 can store the monitored activity (e.g., as or in an activity record) in an activity database 320. In one instance, one, more or each VM component is associated with a record. Performance metrics of the component (e.g., CPU usage and/or memory usage) can be detected at routine intervals. The record can then include an entry with a time stamp and performance metrics. Task assignments (including, e.g., a time of assignment, a source user, whether the task was transferred from another component, a type of task, requirements of the task, whether the task was completed, and/or a time of completion) can also be added to the record. In some instances, performance metrics are detected (and a corresponding record entry is generated and stored) upon detecting a task action (e.g., assignment, transfer, or completion) pertaining to the VM component. Thus, activity database 320 can maintain an indexed or organized set of metrics characterizing historical and/or current performance of hypervisor components.

An aggregator 325 can collect performance metrics from select activity records. The performance metrics can include, e.g., CPU usage, memory usage, tasks assignments and/or task completions. The performance metrics can also include that from entries with time stamps within a particular time period. In some instances, performance metrics are collected from one or more entries having a most recent time stamp (e.g., a most recent entry or all entries within a most-recent 24-hour period).

The activity records can be selected based on an architecture stored in an architecture database 330, the architecture defining a structure (e.g., components and component relationships) of a Hypervisor. Architectures can also specify which specific users or types of users can use some or all of the Hypervisor and/or which specific reviewer or types of reviewers can access (some or all available) performance indicators.

The architecture can be one provided by an architecture provider 105. For example, architecture provider 105 can interact with an architecture manager 335 to define resources in a Hypervisor and relationships between the system. These definitions can be provided, e.g., by entering text, manipulating graphics or uploading a file. It will be appreciated that, while not shown, VM monitoring system 155 can further include an architecture-provider account engine and architecture-provider account database that can be used to authenticate an architecture provider. Architecture-provider accounts can include information similar to that in user accounts and/or reviewer accounts, and the architecture-provider account engine can authenticate an architecture provider in a manner similar to a user or reviewer authentication technique as described herein.

Figure 4:
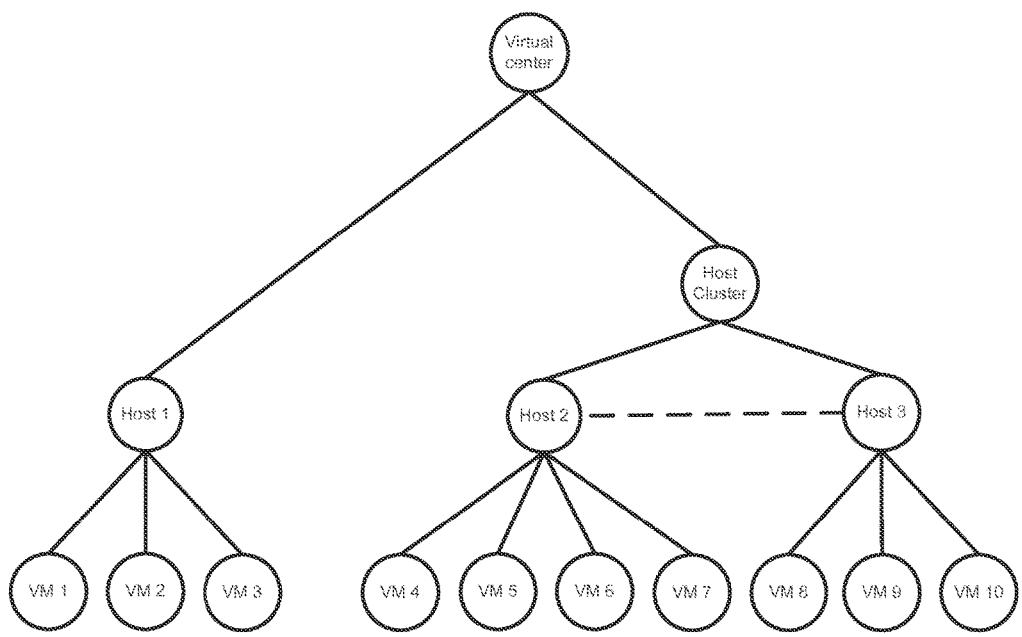
FIG. 4 illustrates an example of a representation of an architecture for a Hypervisor.

FIG. 4 illustrates an example of a representation of an architecture for a Hypervisor. The depicted architecture is hierarchical and includes a plurality of nodes arranged in a plurality of levels. Each node corresponds to a component in the Hypervisor. The hierarchy defines a plurality of familial relationships. For example, VM 6 is a child of Host 2 and a grandchild of the Host Cluster. The top level is the virtual center where tasks are assigned. The second level is a host-cluster level, which indicates which underlying hosts have task-transferring arrangements with each other (the same-level interaction being represented by the dashed line). The third level is a host level that provides computing resources that support VM operation. The fourth level is a VM level. Thus, based on the depicted architecture, an assignment to VM 7 would also entail an assignment to Host 2 and to the Host Cluster; an assignment to VM 3 would also entail an assignment to Host 1

Returning to FIG. 3, aggregator 325 can aggregate performance metrics from records pertaining to a particular component in the architecture. As will be described in further detail below, performance indicators (determined based on performance metrics) associated with components at different levels can be sequentially presented to a reviewer (e.g., in a top-down manner and responsive to reviewer selection of components). Thus, VM monitoring system 155 can, in some instances, also sequentially determine performance indicators (determining lower level indicators following a presentation of higher level indicators and/or to reviewer selection of a component). VM monitoring system 155 can first determine performance indicators for higher-level components and subsequently for each of a subset or all of lower-level components. Thus, aggregator 325 can first aggregate performance metrics in activity records for each of one or more higher-level components and later aggregate performance metrics in activity records for each of one or more lower-level components. It will be appreciated that other sequences can be utilized (e.g., repeatedly cycling through components in a sequence).

A statistics generator 340 can access the collection of performance metrics and generate one performance statistics based on the metrics. The statistic can pertain to any of the various types of performance metrics, such as a CPU usage, a memory usage, assigned tasks, a task-completion duration, etc. The statistic can include, e.g., an average, a median, a mode, a variance, a distribution characteristic (e.g., skew), a probability (which may be a percentage), a conditional probability (e.g., conditioned on recent assignment of a task), a skew, and/or an outlier presence. The statistic can include one or more numbers (e.g., an error and a standard deviation). In some instances, the statistics includes a series of numbers, such as histogram values. Statistics generator 340 can store the statistic (in association with an identifier of a respective component and time period) in a statistics database 345. Statistics generator 340 can identify which component and/or time period are to be associated with the statistic based on what aggregation was performed.

A state engine 350 can access one or more state criteria from state-criteria database 355 and use the state criteria and the generated statistic to assign a state (e.g., to a component and/or time period). The state can then be stored (e.g., in association with a respective component and/or time period) in a state database 360. State engine 350 can identify which component and/or time period are to be associated with the state based on what aggregation was performed.

The state criteria can include one or more thresholds, a function and/or an if-statement. In one instance, two thresholds are set to define three states: if a statistic is below the first threshold, then a first state (e.g., a "normal" state) is assigned; if a statistic is between the thresholds, then a second state (e.g., a "warning" state) is assigned; if a statistic is above the second threshold, then a third state (e.g., a "critical state") is assigned. The state criteria can pertain to multiple statistics (e.g., having a function where a warning state is assigned if any of three statistics are below a respective threshold or if a score generated based on multiple statistics is below a threshold).

The state criteria can include a time-sensitive criteria, such as a threshold based on a past statistic (e.g., indicating that a warning state should be assigned if the statistic has increased by 10-20% since a previous comparable statistic and a warning state should be assigned if it has increased by 20+%), a derivative (calculated based on a current and one or more past statistics) and/or an extrapolation (calculated based on a current and one or more past statistics).

In some instances, multiple states are defined. For example, an overall state can be assigned to the component, and other specific states pertaining to more specific performance qualities (e.g., memory usage, processor usage and/or processing speed) can also be assigned.

The state criteria can be fixed or definable (e.g., by an architecture provider 105 or reviewer 125). The state criteria can be the same across all components and/or time periods or they can vary. For example, criteria applicable to VM components can differ from criteria applicable to higher level components.

In some instances, the state criteria are determined based on a results-oriented empirical analysis. That is, a state engine 350 can use an analysis or model to determine which performance metrics (e.g., a range of values) are indicative of poor or unsatisfactory performance of the Hypervisor.

Thus, a result could be a performance metric for a higher level component or a population user satisfaction rating.

An alarm engine 365 can access one or more alarm criteria from alarm-criteria database 370 and use the alarm criteria and an assigned state to determine whether an alarm is to be presented. In one instance, an alarm criterion indicates that an alarm is to be presented if one or more states are assigned. In one instance, an alarm criterion includes a time-sensitive assessment, such as a criterion that is satisfied when the state has changed to (or below) a specific state and/or has changed by a particular number of states since a last time point.

Alarm engine 365 can present the alarm by, e.g., presenting a warning on an interface (e.g., a webpage or app page), transmitting an email, sending a message (e.g., a text message), making a call or sending a page. A content of the alarm (e.g., email, message, etc.) can identify a current state and/or statistic, a previous state and/or statistic, a trend in the state and/or statistic, an applicable component, an applicable time period, and/or an applicable Hypervisor.

VM monitoring system 155 can include an interface engine 375 that enables a reviewer 115 to request a performance report and/or receive a performance report. The report can include one or more statistics, states, and/or alarm statuses. The report can identify which component and/or time period are associated with the statistic, state and/or alarm status. Interface engine 370 can present most-recent or substantially real-time values (e.g., numerical statistics or states) and/or historical values. In some instances, interface engine accesses a set of values for a given component and generates and presents a table, list or graph to illustrate a change in a performance. The report can also include activity pertaining to a component and/or time period (e.g., tasks assigned, task statuses, etc.).

Interface engine 375 can receive input from reviewer 115, which can cause different information to be presented to the user. In some instances, interface engine 375 merely accesses different data (e.g., states, statistics, alarm statuses and/or activities) from database 320, 345, and/or 360. Interface engine 375 can then present the accessed data itself or generate and present a representation of the data (e.g., generate and present a graph). In some instances, the input causes interface engine 375 to request that aggregator 325 aggregate different performance metrics, that statistics generator 340 generate different statistics, that state engine 350 generate different states and/or that alarm engine 365 re-assess alarm criteria The new data can then be presented to reviewer 115. Thus, the report can be dynamic.

In some instances, the input can include selection of a component. The selection can lead to a presentation (and potentially a generation of) more detailed data pertaining to the component and/or to a presentation of data pertaining to components that are children of the selected component. This former strategy can encourage a user to follow branches down an architecture tree to find, e.g., a source of a high-level problem or to understand best-performing branches.

Figure 5A:
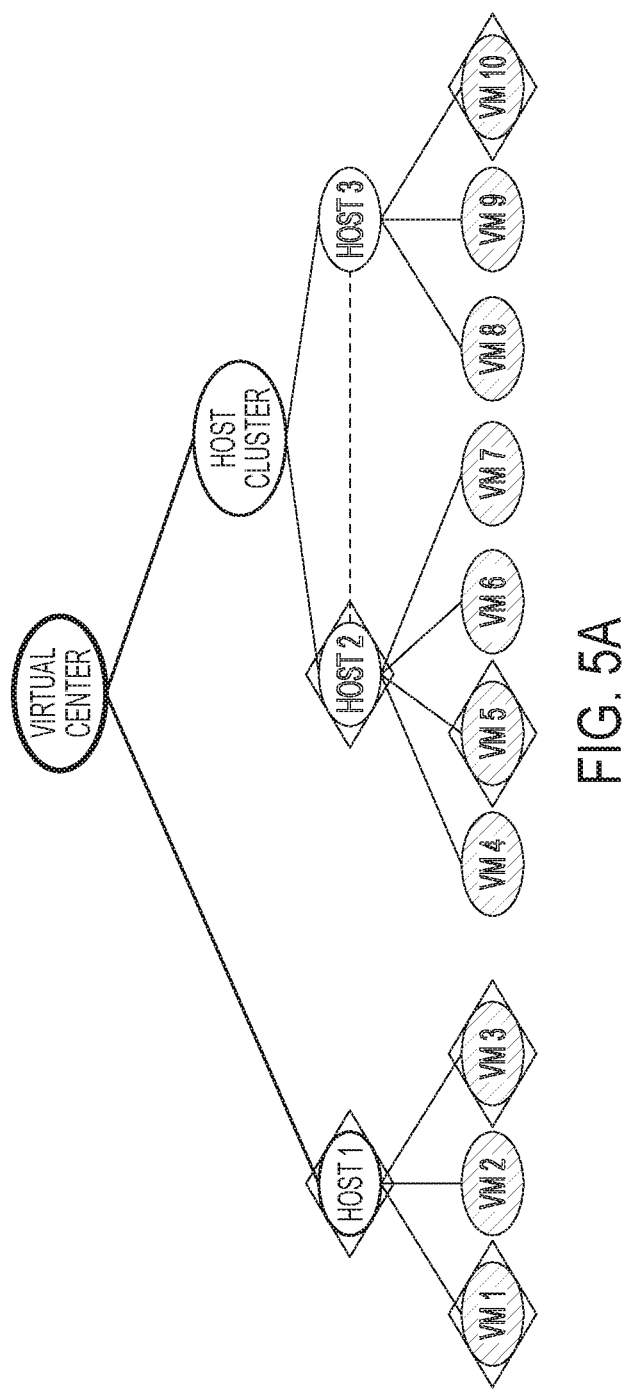
FIGS. 5A-5B illustrate an example of sequential presentations conveying an architecture and system performance that can be presented to a reviewer.
Figure 5B:
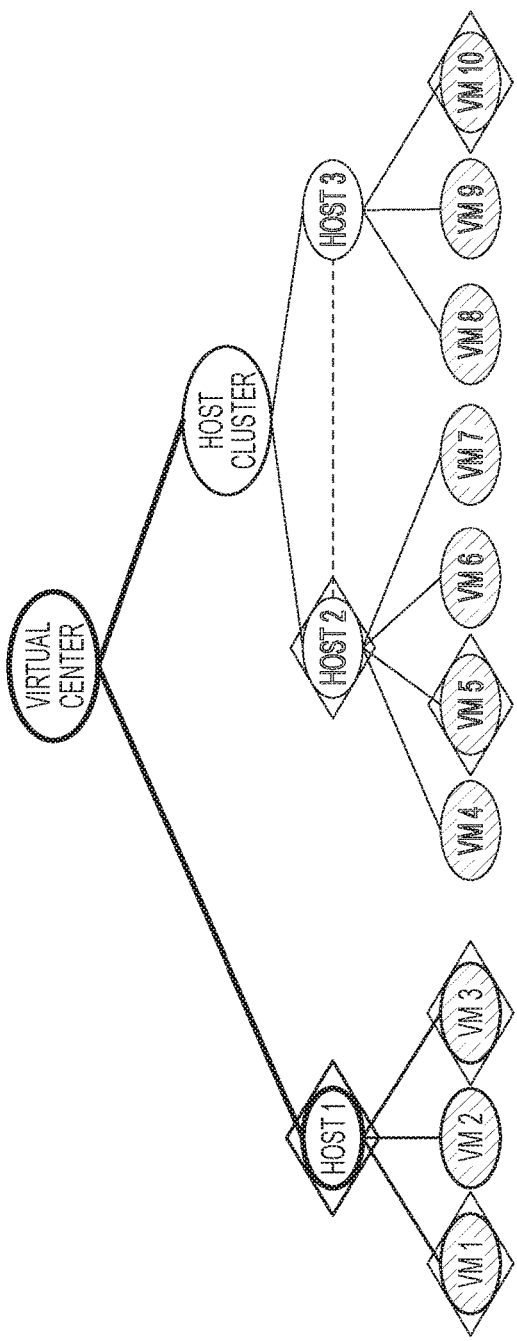

FIGS. 5A-5B illustrate an example of sequential presentations conveying an architecture and system performance that can be presented to a reviewer 125. In FIG. 5A, three relatively high-level nodes are presented. Specifically a highest-level node is presented along with its children. In this instance, the children are at different levels in order to ensure that each presented node has multiple children. It will be appreciated that in other embodiments, the depicted children nodes are in the same level (e.g., such that another "Host Cluster" would be a parent of "Host 1" and have no other children).

As shown, this architecture includes 12 nodes that are hidden in the representation in FIG. 5A. The node hiding can help a user focus on a most likely lower-level cause of an overall sub-par performance.

An overall state of the represented components is indicated based on whether the node is surrounded by a diamond. In this case, nodes in a warning state are surrounded by a diamond. It will be appreciated that other state indicators (e.g., colors, text, icon presence or a number) can be used instead of or in addition to the surrounding indicator.

In this example, a reviewer 125 can select a node by clicking on it. FIG. 5B shows a representation of the architecture and system performance after reviewer 125 selected the Host 1 node (having a warning-state indicator). At this point, the children of Host 1 appear. Two of the child VM nodes also have a warning-state indicator.

FIG. 5B also illustrates how presentations can indicate which nodes are parent nodes. In this case, "fills" or patterns of the node convey this characteristic, with pattern nodes indicating that the nodes are not parents.

The structure-based and concise presentations shown in FIGS. 5A and 5B allow a reviewer to drill down into sub-optimal system performance, to easily understand which system components are properly operating and to easily understand architecture underlying a Hypervisor. However, more detailed performance information can also be presented to a reviewer. For example, detailed information can appear as a transient pop-up when a reviewer 125 hovers a cursor over a component and/or can appear as a report when a reviewer 125 double clicks on a node.

In some instances, an architecture provider 105 and reviewer 125 are a same party. The reviewer 125 can then review a representation, such as one shown in FIGS. 5A-5B and access performance indicators of specific system components. In the same-party instances, reviewer 125 can use the same representation to modify an architecture. For example, reviewer 125 can add, move or delete connections, move child components, add and/or remove components. Reviewer 125 can also select a particular component (e.g., by double clicking a node) and change its properties.

Figure 6A:
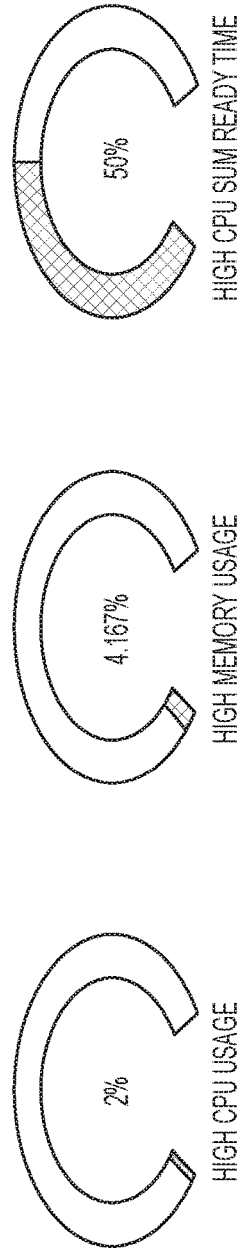
FIGS. 6A-6C illustrate example detailed information that can be presented to characterize performance of a hypervisor system, a host and a VM, respectively.
Figure 6B:
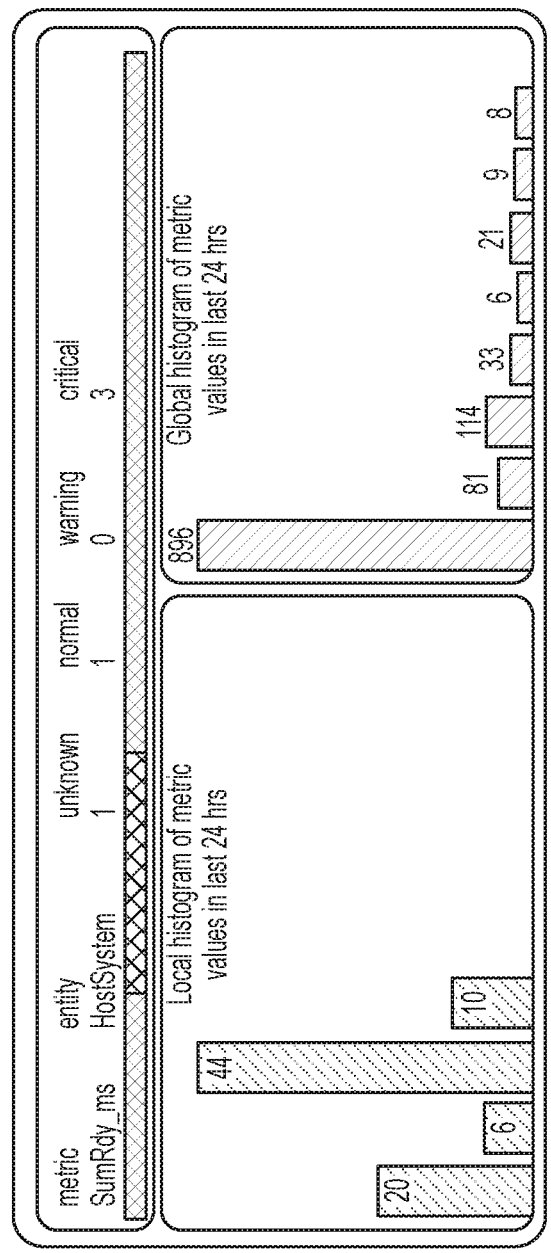
Figure 6C:
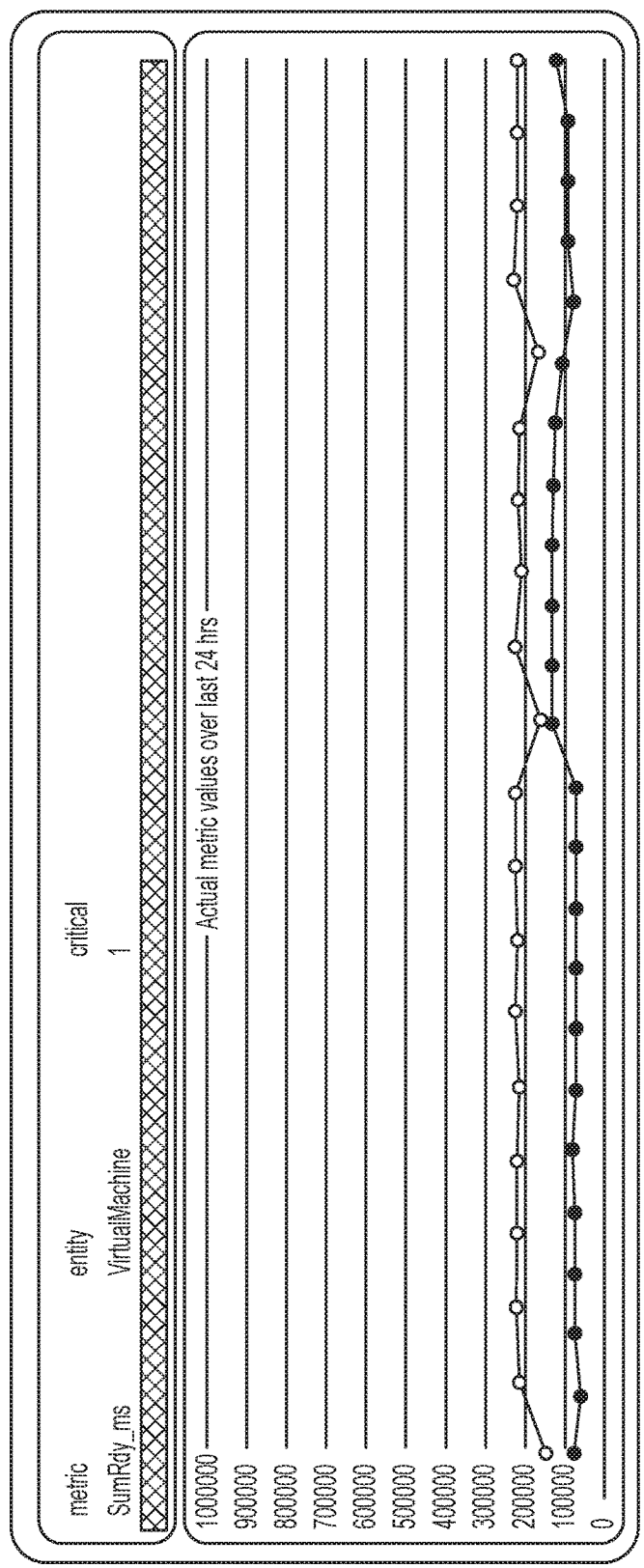

FIGS. 6A-6C illustrate example detailed information that can be presented to characterize performance of a Hypervisor, a host and a VM, respectively. These graphics can be presented in response to a reviewer 125 hovering over a specific hypervisor component. FIG. 6A shows gauges presenting information pertaining to an overall Hypervisor. The gauges identify a percentage of VMs in a Hypervisor having undesirable states. The left gauge shows a percentage of VMs with a state for CPU usage in a "high" category. The middle gauge shows a percentage of VMs with a state for memory usage in a "high" category. The right gauge shows a percentage of VMs within a state for an amount of time a VM is waiting to use a processor that is in a "high" category. Thus, 33% of VMs are seemingly affected in their processing capabilities based on overloading of 2% of VMs. Thus, it would be useful to identify which VMs are within the 2% and/or 4.2% and a source of the problem for those VMs.

It will be appreciated that other high-level performance indicators can be presented (e.g., ones related to memory. For example, other gauges could identify memory performance indicators. For example, a gauge could identify a percentage of hosts with a "high" amount of memory being used, having a "high" amount of memory ballooning (during which a host is requesting memory be returned from a VM to the host), or having a "high" amount of memory swapping (during which a host is forcefully taking back memory from a VM). Host processing characteristics (e.g., a percentage of hosts with "high" CPU usage) can also be presented for hosts.

FIG. 6B shows information pertaining to a particular host in a Hypervisor. The presented data compares performance characteristics of the host's children to more global comparable characteristics. The left bar graph shows a histogram across VMs assigned to the host identifying a sum-ready performance metric (identifying a time that the VM must wait before using a processor). The right bar graph is comparable but characterizes all VMs within a Hypervisor. In this instance, the right histogram is highly skewed to the left, while the left histogram does not exhibit a similar skew. The histogram thus suggests that the sub-network of the host and its children is not operating as well as is possible.

FIG. 6C shows a time-graph of the same waiting-time metrics for a VM across period of times (in the lighter line). Specifically, each point in the graph represents the waiting-time metric for a period of time. A comparable average metric across all VMs is simultaneously presented (in the darker line). The higher values underscore sub-optimal performance, as the processor is experiencing higher than average wait times. This presentation allows a reviewer 125 to understand whether a VM's performance is particularly poor relative to other VMs' performances, identify whether and when any substantial changes in the performance occurred, and to identify and whether poor performance is becoming a consistent problem. Further, the historical plot may allow a reviewer 125 to notice a positive or negative trend in the performance metric, such that a problem can be remedied before it becomes serious.

The historical presentation in FIG. 6C thus offers valuable insight as to a component's performance, when a change in performance occurred, and whether the performance warrants a change in the VM architecture. The historical presentation, however, requires that historical performance characteristics be stored and indexed (e.g., by time and/or component). This is complicated by the facts that this can be a very large amount of data. Storing all raw performance metrics is, not only a very large amount of data, but then the metrics must be repeatedly re-aggregated and historical performance statistics and/or states must be repeatedly recalculated. This can result in a delay of a presentation to a reviewer 125, which can be particularly noticeable if the presentation is supposed to be presented transiently and quickly as the reviewer hovers his cursor over a particular depiction. Meanwhile, storing only statistics and/or states and not the metrics limits the ability to customize which statistics and/or states are presented (e.g., by fixing time periods instead of allowing statistics to be calculated on a flexible basis depending on a reviewer's interest and reviewing time) and can itself even lead to a large amount of data to store, due to many types of performance variables being calculated at many levels (meaning that a single performance metric may, in combination with other metrics, give rise to several performance statistics and/or states).

Figure 7B:
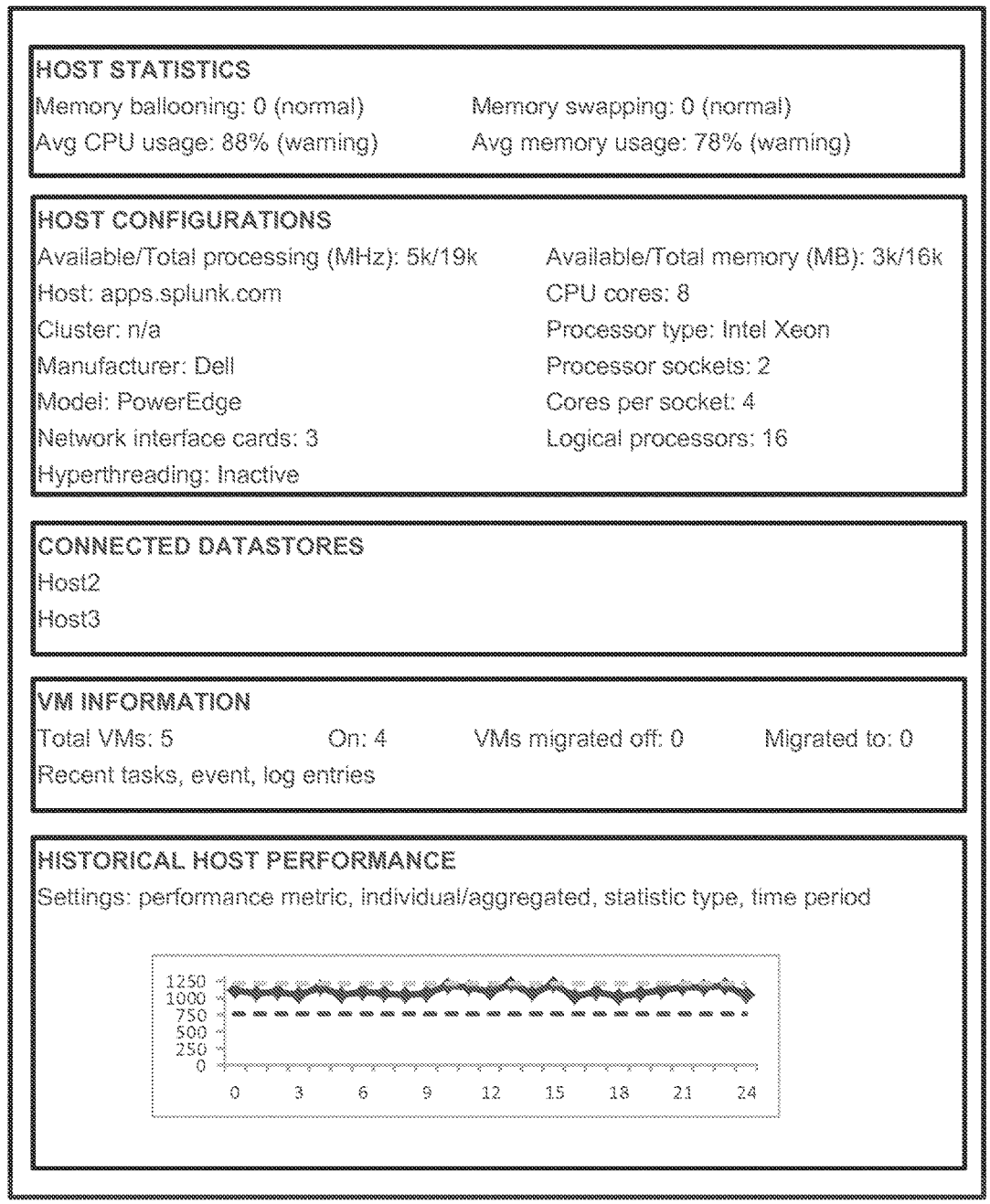
Figure 7C:
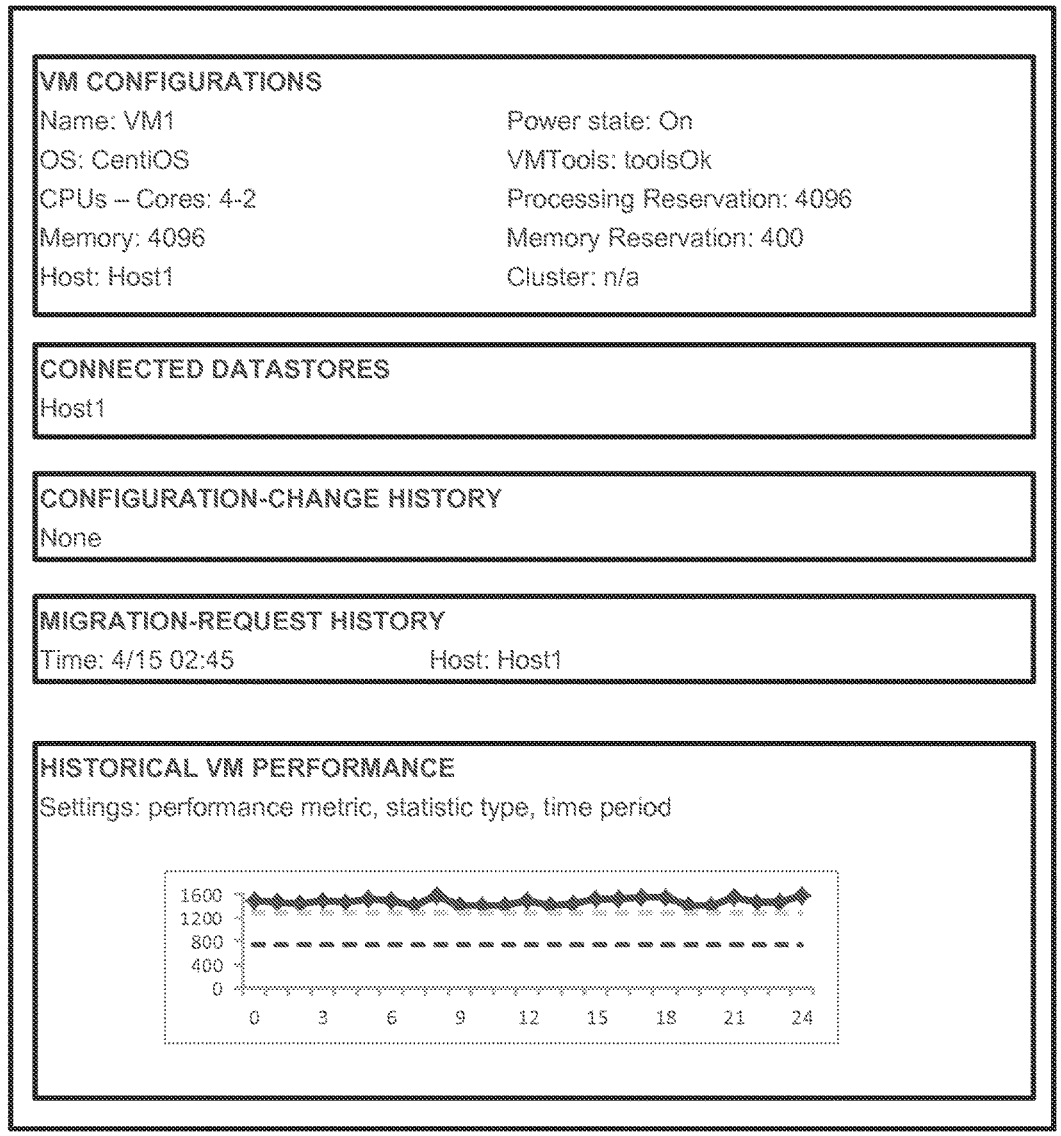

FIGS. 7A-7C further illustrate example detailed information that can be presented to characterize performance of a Hypervisor, a host and a VM, respectively. These reports can be presented in response to a reviewer 125 selecting (e.g., by double clicking) a specific VM-system component. FIG. 7A illustrates a report for a Hypervisor. The report can include information about hosts in the system and VMs in the system. The report can identify system properties, such as a number and type of components within the systems. In the illustrated example, the system includes 4 hosts and 74 VMs. The report can also characterize provider-initiated or automatic architecture changes, such as a number of times a VM automatically migrated to another host (e.g., based on a host-clustering architecture defined by an architecture provider). It will be appreciated that more and/or more detailed information can be presented regarding architecture changes, such as identifying whether the change was automatic, identifying a time of the change, and/or identifying involved components.

In this example, a host-status section identifies hosts by name and storage capacity. A current status of each host is also indicated by showing an amount of the host's capacity that is committed to served VMs and an amount by which the host is overprovisioned. High commitment and overprovisioning numbers can be indicative of poor performance. It will be appreciated that the host information could be expanded to include, e.g., an overall or host-specific memory-ballooning or memory-swapping statistic, host-clustering arrangements, and/or an overall or host-specific CPU usage.

The report can also identify past alarms in an alarm-history section. For each alarm, an applicable component can be identified, a time of the alarm can be identified and a substance or meaning of an alarm can be identified. These alarms can identify state changes for particular components.

FIG. 7B illustrates a report for a host. Overall performance statistics and corresponding states are presented in a host-statistics section. These statistics can be recent or real-time statistics and can be equivalent to instantaneous performance metrics or can be calculated using performance metrics from a recent time period. A host-configurations section identifies the equipment and capabilities of the host. A connected-datastores section identifies which other hosts in the Hypervisor the instant host is connected to (e.g., via a clustering arrangement). In some instances, the section is expanded to identify a type of connection or a length of time that the connection has existed.

A VM-information section identifies VMs assigned to the host. In the illustrated example, the report identified a number of VMs that are assigned and a number of those in a power-on state. The report also identifies the number of VMs that migrated to or from the host (e.g., via a host-clustering arrangements). The report can list recent VM tasks, events and/or log entries, and can identify an applicable time, VM and description. For example, tasks can include changing a resource configuration for a VM, adding a VM to a host, and establishing a remote connection. Events can include presented alarms, VM migrations (from host to host), task migrations (from VM to VM), and warnings potential architecture problems (e.g., based on actual or predicted insufficiency of resources to support assigned child components or tasks). Log entries can include identifications of unrecognized URI versions and software warnings.

A historical-host-performance section shows how a performance statistic has been changing over time. In the depicted instance, the historical statistics (which can include a final real-time statistic) are shown graphically, along with a "normal" threshold (shown as the bottom, dark dashed line) and a "critical" threshold (shown as the top, gray dashed line). Reviewer 125 is able to set settings to control the statistical presentation. For example, reviewer 125 can identify a performance metric of interest (e.g., CPU usage, memory usage, etc.), whether data is to be aggregated across VMs to derive the statistic, a statistic type (e.g., average, median, maximum, minimum, mode, variance, etc.), and a time period (e.g., 24 hours). Other settings may further be presented, such as time discretization during the time period and graph-formatting options (e.g., marker presence, marker size, line style, axis-tick settings, etc.).

FIG. 7C illustrates a report for a VM. A VM-configurations section identifies the resources allocated to the VM and other VM and/or relationship characteristics (e.g., a name, assigned host and/or assigned cluster). A connected-datastores section identifies which hosts are, per an existing architecture, responsible for providing resources to the VM. A configuration-change-history section identifies a time and type of a past change to the configuration of the VM and a party initiating the change.

A migration-request-history identifies any attempts and/or successes for migrating the VM from one host to the next. Thus, in this case, it appears as though the VM was attempting to migrate off of the VM but failed. This report also includes a historical-performance section, which can have similar presentation and setting-changing abilities as the similar section from the host report. It will be appreciated that, e.g., thresholds can differ between the two. For example, a warning threshold can be stricter for a host, since more VMs contribute to the statistic and diminish the probability of observing extreme values.

It will also be appreciated that reports can include links to other reports. For example, in the report in FIG. 7C, a reviewer 125 can click on "Host1" to move to the report shown in FIG. 7B for that component. Thus, reviewer 125 can navigate via the reports to access performance and configuration details for related hypervisor components.

Thus, the presentations shown from FIGS. 5A-7C show a variety of ways by which a reviewer 125 can understand how a Hypervisor is structured and performing. By tying together structural and performance information, a reviewer 125 can begin to understand what architecture elements may be giving rise to performance problems and can appropriately improve the architecture. Further, the presentations show how a given performance measure compares to other performance measures. One such comparison is an inter-system-component comparison, which can enable a reviewer 125 to identify a reasonableness of a performance metric and determine a level at which a problem could best be addressed. Another such comparison is a historical comparison, which can allow reviewer 125 to identify concerning trends and/or to pinpoint times at which substantial performance changes occurred. Reviewer 125 can then review configuration-change or task histories to determine whether any events likely gave rise to the performance change.

Figure 8:
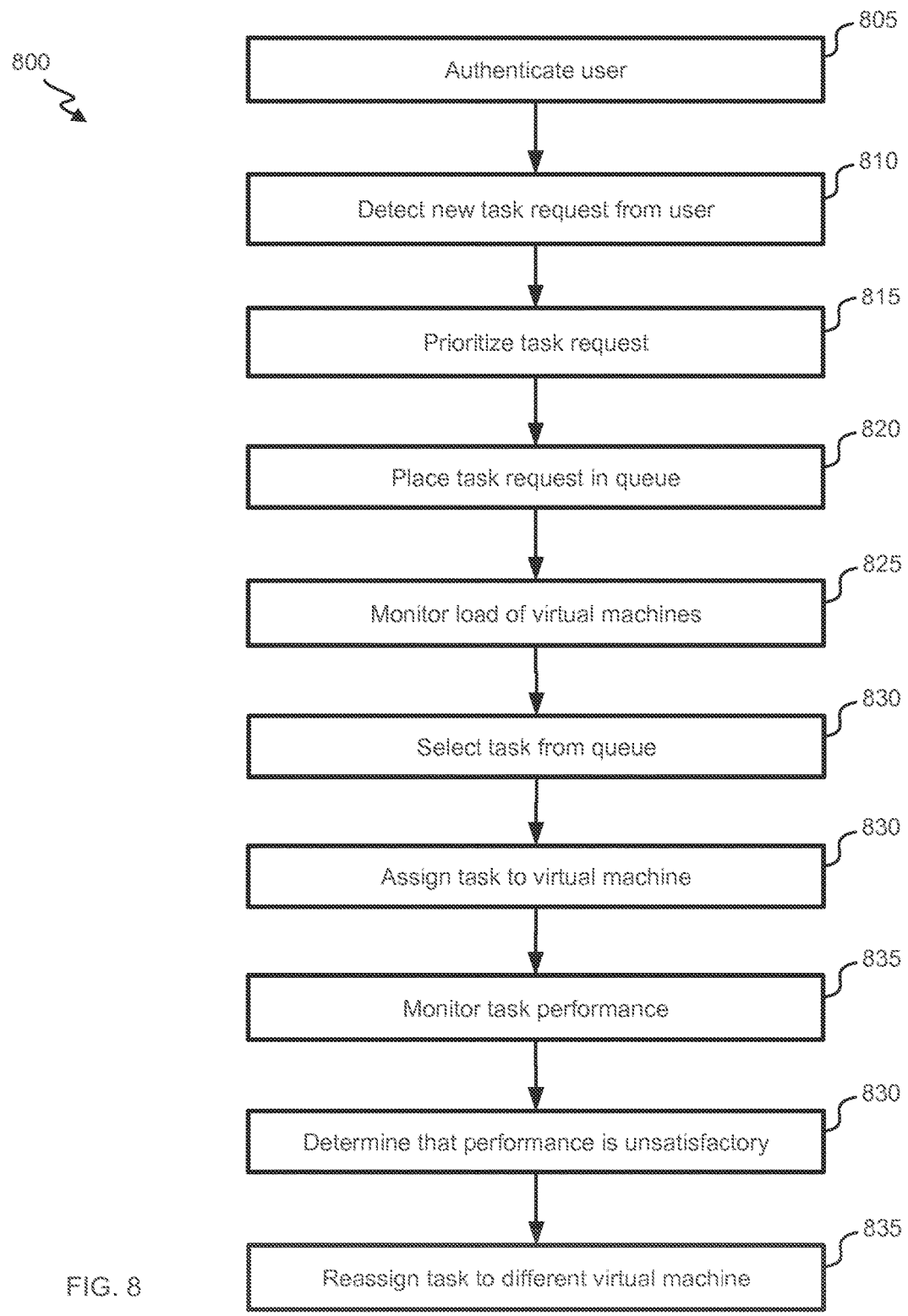
FIG. 8 illustrates a flowchart of an embodiment of a process for using a VM machine to complete user tasks.

FIG. 8 illustrates a flowchart of an embodiment of a process 800 for using a VM machine to complete user tasks. Process 800 begins at block 805, where user account engine 205 authenticates a user 110. Task intake 215 detects a new task request from user 110 at block 810.

Prioritizer 225 prioritizes the task request (e.g., based on characteristics of user 110, characteristics of the task, system load and/or when the request was received) at block 815. The prioritization can include generating a score, assigning a priority class or assigning a ranking. Task intake 215 places a queue item identifying the task in queue 220 at block 820. The priority of the task can be reflected within the queue item itself, by the queue item's placement within a ranking or by a priority indicator associated with the queue item. Load monitor 230 monitors loads of virtual machines (e.g., and/or hosts) at block 825. The monitoring can include detecting characteristics of tasks being processed (e.g., resource requirements, a current total processing time, and/ or which user who submitted the task). Assigner 235 selects the task from queue 220 at block 830. The selection can occur, e.g., once the task is at sufficiently high priority to be selected over other tasks and can further occur once appropriate resources are available to process the task. Assigner 235 assigns the task to a VM at block 835. The VM to which the task is assigned can be a VM with sufficient available resources to process the task. Assignment to a VM can further include assigning the task to a host and/or host cluster.

Task monitor 240 monitors performance of the task at the assigned VM at block 840. For example, task monitor 240 can detect whether a VM appears to be stalled in that it has not completed the task for over a threshold duration of time. As another example, task monitor 240 can monitor how much of the VM's processing power and/or memory appears to be being consumed by the task performance. As another example, task monitor 240 can determine whether any errors are occurring during the task performance. In some instances, task monitor 240 determines that the performance is unsatisfactory at block 845 (e.g., based on too much consumption of the VM resources, too long of a processing time and/or too many errors), and assigner subsequently reassigns the task to a different VM at block 850. The different VM can be one with more resources than the initial VM, one in a larger host-clustering network, and/or one currently processing fewer or less intensive tasks as compared to those otherwise being processed by the initial VM.

Figure 9:
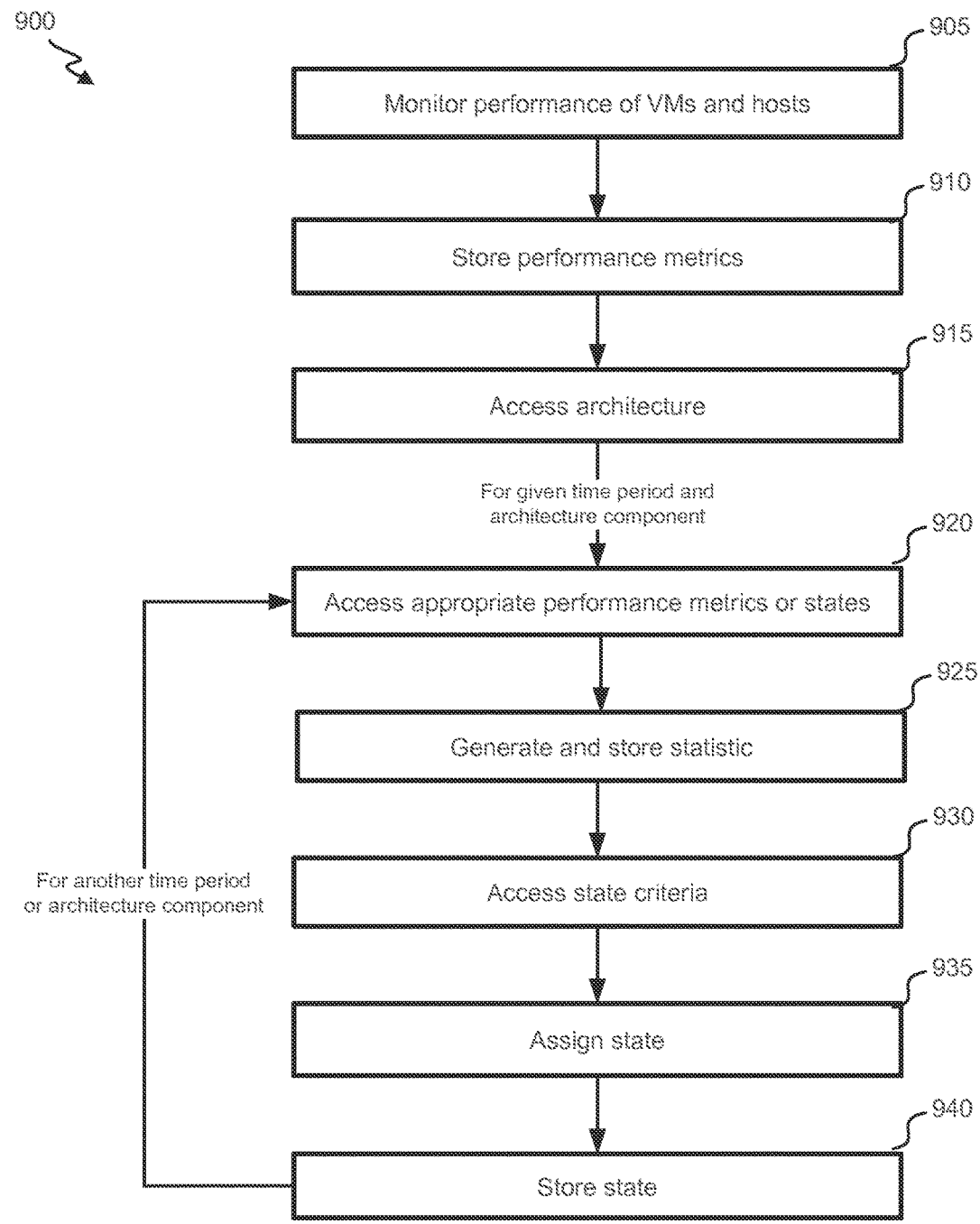
FIG. 9 illustrates a flowchart of an embodiment of a process for characterizing VM-system components' performance.

FIG. 9 illustrates a flowchart of an embodiment of a process 900 for characterizing hypervisor components' performance. Process 900 begins at block 905, where activity monitor 315 monitors performance of VMs and hosts. Through this monitoring, activity monitor 315 can detect performance metrics, such as CPU usage, memory usage, task assignment counts, task assignment types, task completion counts, and/or migrations to/from the VM or to/from the host. Activity monitor 315 stores the detected performance metrics in activity database 320 at block 910.

Aggregator 325 accesses an applicable architecture from architecture database 330 at block 915. The applicable architecture can be one associated with a reviewer, one randomly selected, or one defining a Hypervisor of interest. The architecture can identify some or all of the VMs and/or hosts monitored at block 905. The architecture can identify relationships from the VM to other hypervisor components.

Aggregator 325 identifies one of the components from the architecture and a time period. The time period can include a current time/time period (i.e., real-time or most recent time in activity database 320 for the component) or a previous time period. In some instances, process 900 first characterizes performance of low-level components (e.g., VMs) before characterizing performance of high-level components.

Aggregator 325 accesses appropriate performance metrics or states at block 920. In some instances, for low-level components, performance metrics can be accessed from activity database 320. In some instances, for high-level components, states of children of the components can be accessed from state database 360. In some instances, performance metrics are accessed from activity database 320 for all components.

Statistics generator 340 generates a statistic based on the accessed metrics or states and stores the statistic in statistic database 345 at block 925. The statistic can include, e.g., an average or extreme metric across the time period or a percentage of children components having been assigned to one or more specific states (e.g., any of states red, orange, or yellow).

State engine 350 accesses one or more state criteria from state-criteria database 355 at block 930. Which state criteria are accessed can depend on which component is being assessed. In one instance, different levels in an architecture have different criteria.

State engine 350 assesses the criteria in view of the statistic to determine which state the component is in during the time period. State engine 350 then assigns the component to that state (as a present state or a past state associated with the time period) at block 935.

State engine 350 stores the state in association with the component and time period in state database 360 at block 940. Process 900 can then return to block 920 and repeat blocks 920-940 for a different component and/or a different time period. For example, process can repeat in this manner to continue to identify and store current statistics and/or states.

Figure 10:
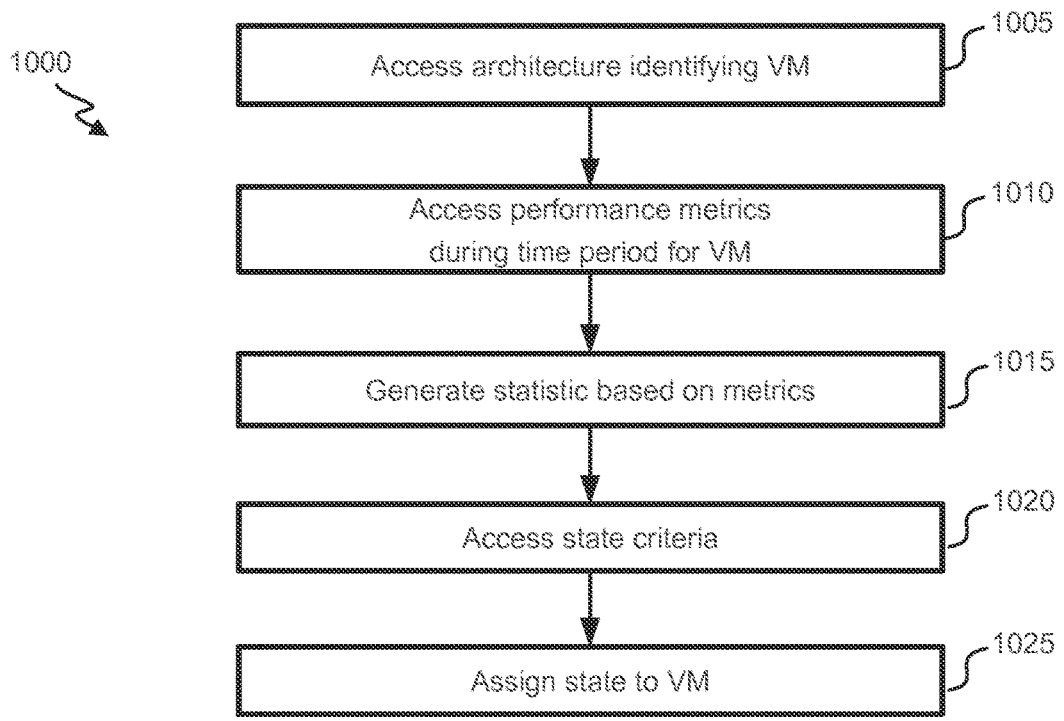
FIG. 10 illustrates a flowchart of an embodiment of a process for assigning a performance state to a low-level component in a Hypervisor.
Figure 11:
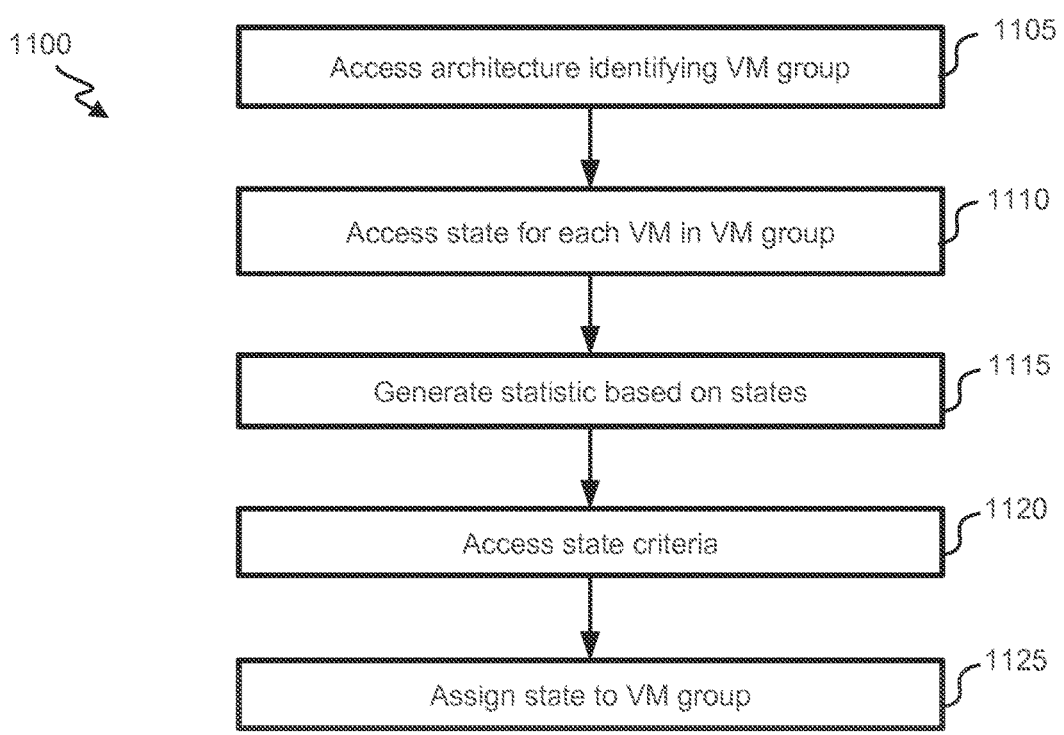
FIG. 11 illustrates a flowchart of an embodiment of a process for assigning a performance state to a high-level component in a Hypervisor.

State determinations for higher-level components can depend on performances of underlying children low-level components. One technique for arriving at the higher-level state would then be to aggregate performance metrics from all children components, generate a statistic based on the aggregated metrics, and identify a state based on the statistic. However, this approach could lead to a positive state assignment even in the case where a small number of children components were performing very poorly. The aggregate analysis could over-look this problem due to the mitigation of the poor data by other positive data from properly performing children components. Thus, another approach is to first identify a state for each child component and to then determine a state for a parent component based on the states (not the direct metrics) of the child components. The state criteria can then set forth, e.g., a threshold number of child state assignments to a negative state that would cause the parent component to also be assigned to a negative state. FIGS. 10-11 illustrate example processes for state assignments determined using this approach.

FIG. 10 illustrates a flowchart of an embodiment of a process 1000 for assigning a performance state to a low-level component in a Hypervisor. Process 1000 begins at block 1005, where aggregator 325 accesses an applicable architecture from architecture database 330. The architecture identifies a particular VM, and aggregator 325 accesses performance metrics characterizing the VM's performance during a time period from activity database 320 at block 1010. Based on the metrics, statistic generator 340 generates a performance statistic (e.g., an average of the metrics) at block 1015.

State engine 350 accesses one or more state criteria from state-criteria database 355 at block 1020. In some instances, state-criteria database 355 includes multiple criteria, which may apply to different component types (e.g., having different configurations or capabilities), different architecture levels, different architectures, and/or different reviewers. Thus, at block 1020, state engine 350 can select the criteria that are applicable to the VM and/or to a reviewing reviewer. State engine 350 evaluates the statistic in view of the accessed criteria, and, as a result of the evaluation, assigns a state to the VM at block 1020.

FIG. 11 illustrates a flowchart of an embodiment of a process 1100 for assigning a performance state to a high-level component in a Hypervisor. Process 1100 begins at block 1105, where aggregator 325 accesses an applicable architecture from architecture database 330. This architecture can be the same architecture as accessed at block 1005 in process 1000. The architecture can include a component that is a parent of the VM from process 1000. Thus, the architecture can include a VM-group component (e.g., a host).

Aggregator 325 accesses a state, from state database 360, for each VM in the VM group at block 1110. Statistics generator 340 generates a performance statistic based on the accessed states at block 1115. The statistic can include, e.g., an average, a percentage of VMs being assigned to a particular state, a percentage of VMs being assigned to a particular state or a worse state, etc. State engine 350 accesses state criteria from state-criteria database 355 at block 1120. As in process 1000, this access can include selecting the criteria that are applicable to the VM group and/or reviewing reviewer. It will be appreciated that the state criteria accessed at block 1120 can differ from the state criteria accessed at block 1020. State engine 350 evaluates the statistic in view of the accessed criteria, and, as a result of the evaluation, assigns state to VM group at block 1120.

Despite the potential difference in the criteria used in processes 1000 and 1100, the types of potential states that can be assigned can be similar or the same. This can enable a reviewer 125 to easily understand how well the component is performing without having to understand the different criteria used in the assessment.

Figure 12:
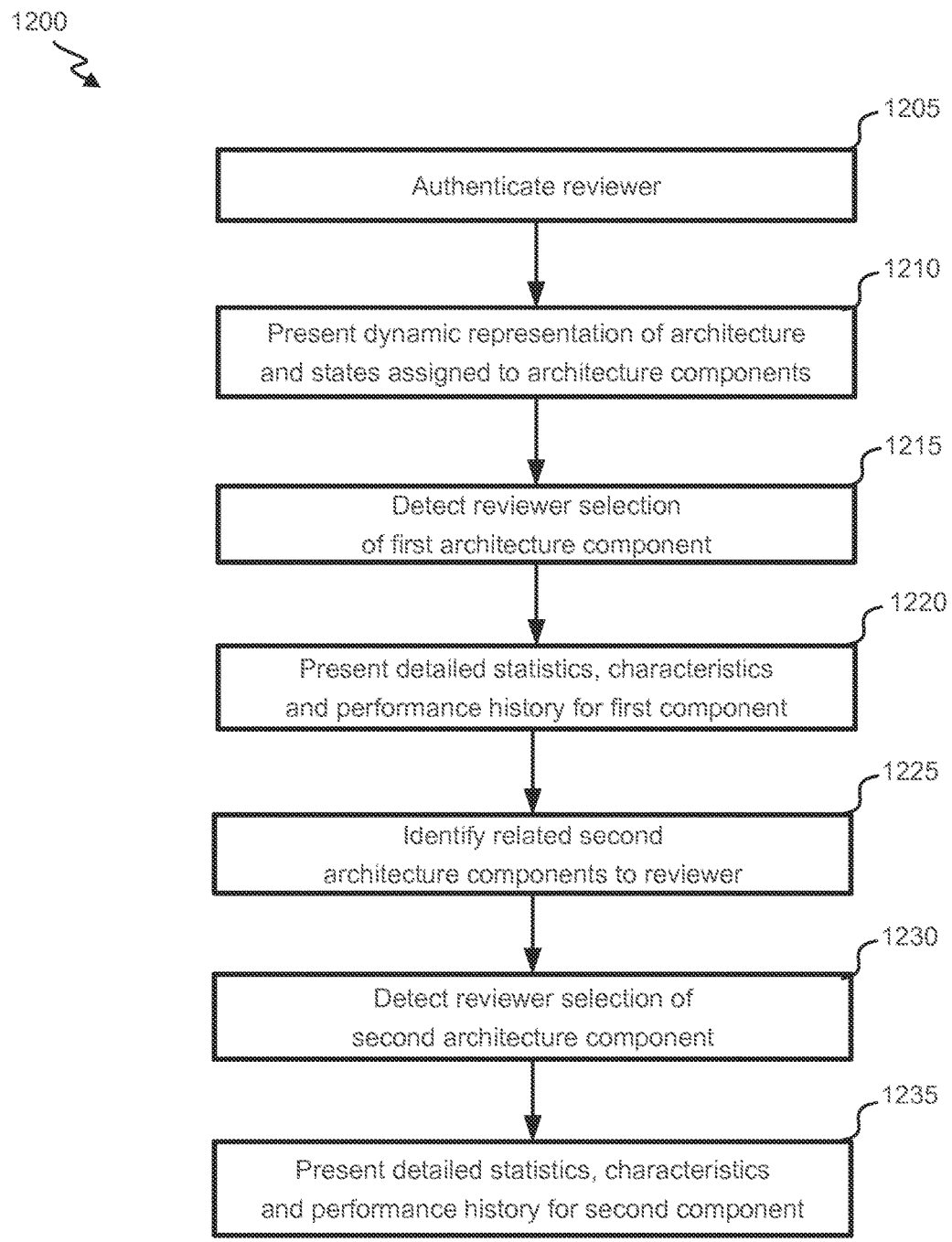
FIG. 12 illustrates a flowchart of an embodiment of a process for using a VM machine to complete user tasks.

FIG. 12 illustrates a flowchart of an embodiment of a process 1200 for using a VM machine to complete user tasks. Process 1200 begins at block 1205, where reviewer account engine 305 authenticates a reviewer 125.

At block 1210, interface engine 375 presents, to reviewer 125, a dynamic representation of at least part of an architecture of a Hypervisor and, for each of a set of components represented in the architecture, a performance state assigned to the component. In some instances, the architecture and performance states are simultaneously represented to reviewer 125.

The architecture can be presented by displaying a series of nodes—each node representing a hypervisor component. The nodes can be connected to show relationships. Relationships can include, e.g., resource-providing relationships (e.g., between a host and VM), migration-enabling relationships (e.g., between two hosts in a cluster, which can be denoted via a direct connection or an indirect connection via an upper level host-cluster component). The nodes can be presented in a hierarchical manner, and relationships can include familial (e.g., parent-child) relationships. It will be appreciated that the architecture can be presented in a variety of other manners. For example, a series of lists can identify, for each of a set of components, respective "children" components. As another example, rows and columns in a matrix can identify columns, and cells in the matrix can identify relationship presence and/or a type of relationship.

The presentation of the architecture can include identifying all components and relationships in the architecture or a subset of the components and relationships. The subset can include, e.g., components in a highest level in the architecture or in the highest n levels (e.g., n being 2, 3, 4, etc.) and not components in the lower levels. Such a representation can encourage a reviewer 125 to assess a Hypervisor's performance in a top-down manner, rather than requiring that a reviewer 125 already know a lower-level source of sub-optimal performance.

A performance state can be represented by a color, word, pattern, icon, or line width. For example, nodes in a representation of an architecture can have an appearance characteristic (e.g., a line color, a line thickness, or a shading) that depends on the state of the represented component.

The performance state can include an overall performance state. The overall performance state can be determined based on a plurality of factors, such as CPU usage, memory usage, task-processing times, task-processing intake numbers, and/or received or transmitted task migrations. In some instances, a value for each factor is identified and weighted, and a sum of the weighted values is used to determine the overall performance state. In some instances, an overall performance state depends on whether any of one or more factors fail respective satisfaction criteria or fall into a particular state (e.g., a warning state).

In some instances, the performance state is not an overall performance state but instead relates to a particular performance factors. States pertaining to different performance factors can be simultaneously presented (e.g., via matrices or lists or via repeated presentation of a family tree with state distinguishers). In one instance, a single family tree is shown to represent the architecture, and each node can have a graphical element (e.g., a line width, line color, shading, icon presence, etc.) that represents a state for one performance factor. Thus, e.g., by looking at line width, a reviewer 125 could evaluate CPU-usage performances, and, by looking at line color, reviewer 125 could evaluate memory-usage performances.

In some instances, a reviewer 125 can select a performance factor of interest. For example, a user can select "CPU usage" from a performance-factor menu, and nodes in a family tree can then be differentially represented based on their CPU-usage performance.

Interface engine 375 detects a selection from reviewer 125 of a first architecture component at block 1215. The selection can include, e.g., clicking on or hovering over a component representation (e.g., a node, column heading, or row heading).

Interface engine 375 presents a detailed performance statistic, component characteristic and/or performance history for selected first component at block 1220. The statistic, characteristic and/or history can pertain to the first component or to a child or children of the first components. A performance statistic can include a recent or real-time performance statistic (e.g., average CPU usage). A component characteristic can include, e.g., resources assigned to the component or equipment of the component. A performance history can include a past performance statistic. In some instances, a statistic and/or performance history is presented with a threshold value or a comparison (e.g., population) value. The presentation can include a numerical, text and/or graphical presentation. For example, performance history can be shown in a line graph. In some instances, different statistics, characteristics and/or performance history is presented based on a selection characteristic. For example, hovering over a component node can cause an overall performance statistic for the component to be shown, while more detailed statistics and/or structure characteristics can be presented responsive to a clicking on the component node.

Also responsive to the reviewer's selection, interface engine 375 presents identifications of one or more second architecture components related to the first architecture component at block 1225. This identification can include expanding a representation of the architecture to include representations of the second components (which may have been previously hidden). In some instances, part of the architecture that was initially presented is also hidden at block 1225. This can include, e.g., nodes of components along a non-selected branch in a family-tree architecture. The second components can include components that are children of the first architecture component. States assigned to the second architecture components can also be (e.g., simultaneously) presented.

Interface engine 375 detects a reviewer's selection of one of the identified second architecture components at block 1230. The selection can include a same or similar type of selection as that detected at block 1215.

Interface engine 375 presents a detailed performance statistic, component characteristic and/or performance history for the selected second component at block 1235. The presentation at block 1235 can mirror that at block 1220 or can be different. In some instances, the presentation at block 1220 relates to performances and/or characteristics of child components of the first component, and the presentation at block 1235 relates to a performance and/or characteristic of the second component (e.g., as the second component may not have child components).

Figure 13:
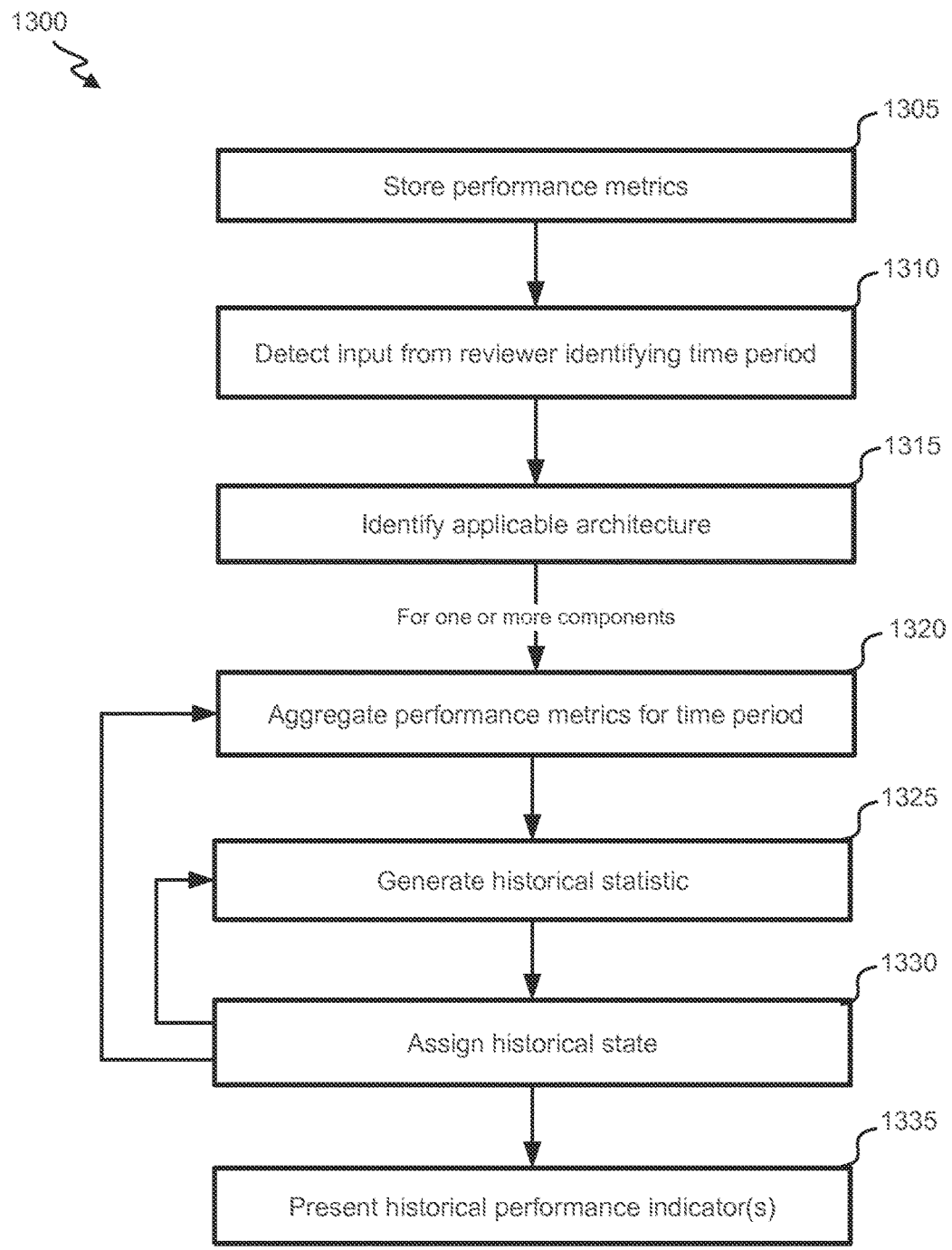
FIG. 13 illustrates a flowchart of an embodiment of a process for analyzing performance of a Hypervisor using historical data.

FIG. 13 illustrates a flowchart of an embodiment of a process 1300 for analyzing performance of a Hypervisor using historical data. Process 1300 begins at block 1305, where activity monitor 315 stores the detected performance metrics in activity database 320. Block 1305 can parallel block 910 from process 900. Interface engine 375 detects input from a reviewer 125 at block 1310. The input can identify a time period. Identification of the time period can include identifying a duration of the time period and/or identifying one or both endpoints of the time period. Identification of an endpoint can include identifying an absolute date and/or time (e.g., Apr. 1, 2013, 1 pm) or a relative date and/or time (14 days ago). The input can include a discretization that can be used to define discrete time intervals within the time period. The input can include entry of a number and/or text and/or selection of an option (e.g. using a scroll-down menu, a sliding cursor bar, list menu options, etc.).

In some instances, a beginning and/or end endpoint of the time period can be at least 1, 2, 3, 7, 14, or 21 days or 1, 2, 3, 6, or 12 months prior to the detection of the input. The time period can have a duration that is at least, that is, or that is less than, 1, 4, 8 12 or 24 hours; 1, 2, or 4 weeks or 1, 2 or 3 months. Time periods for intra-time-period time intervals can be equal to or less than 1, 5, 15 or 30 seconds; 1, 5, 15 or 30 minutes; or 1, 2, 4 or 6 hours.

Architecture manager 335 identifies an applicable architecture at block 1315. The architecture can be one that characterized a structure of the Hypervisor during the identified time period. In some instances, the architecture differs from a current architecture. The architecture can be explicitly or implicitly identified. As an example of implicit identification, activity database 320 can index performance metrics according to direct and indirect components. Thus, a VM CPU usage can be associated with both an identifier of the respective VM and an identifier of a host connected to the VM at the time that the metric was obtained.

Process 1300 continues to then perform blocks 1320-1330 or 1325-1330 for each of one, more or all components in the architecture. In instances in which the time period is to be analyzed in a discretized manner, blocks 1320-1330 or 1325-1330 can also be repeated for each discrete time interval in the time period. In these latter cases, it will be appreciated that multiple applicable architectures can be identified to account for any architecture changes during the time period.

Statistics generator 340 generates a historical statistic at block 1320. The historical statistic can be of a type similar or the same as a performance statistic described herein and can be determined in a similar manner as described herein. It will thus be appreciated that, e.g., depending on a component type, a historical statistic can be determined directly based on the performance metrics (e.g., to determine an average CPU usage) or can be determined based on lower-level component states (e.g., to determine a percentage of VMs with warning-level CPU usages).

State engine 350 accesses an appropriate state criterion and evaluates the generated statistic in view of the criterion. Based on the evaluation, state engine 350 assigns a historical state to the component at block 1330. Interface engine 375 presents historical performance indicator(s). The historical indicators can include historical statistics and/or historical states. As before, the performance indicators can be simultaneously presented along with a representation of the applicable architecture (e.g., by distinguishing appearances of nodes in an architecture family tree based on their states).

Thus, granular low-level performance data can be dynamically accessed and analyzed based on performance characteristics and time periods of interest to a reviewer 125. By scanning through time periods, reviewer 125 may be able to identify time points at which performance changed. Reviewer 125 can then drill down into the component details to understand potential reasons for the change or note any time-locked architecture. Simultaneous presentation of performance indicators and architecture representations aid in the ability to detect temporal coincidence of architecture changes and performance changes.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
   causing display of a representation of a subset of components of a computing environment, wherein components of the computing environment include at least one cluster comprising at least one high level machine and a plurality of low level machines, wherein the representation depicts hierarchical relationships between user-selectable components corresponding to at least a subset of the components in the computing environment;
   upon receiving a selection of a component determined to be a parent component having at least one child component in the computing environment:
   determining a performance metric for each child component of the parent component wherein the performance metric for the child component indicates a performance of the child component;
   determining a performance state for each child component of the parent component based on the performance metric for the child component and a child-component state criterion, wherein the child-component state criterion associates each of a plurality of performance states with separate range of values of the performance metric for the child component;
   determining a parent state for the parent component based on performance states of the associated child components and a parent-component state criterion, wherein the parent-component state criterion associates the parent state with a particular performance state based on a threshold percentage or number of the associated child components that have the particular performance state; and
   causing display of an indication of the state of the parent component wherein if the display does not include a representation of the associated child components, causing display of the associated child components, indications of their performance states, and their hierarchical relationship to the selected parent component, wherein the computing environment is modified using the display of the representation of the subset of the computing environment by moving, adding or removing the user-selectable components corresponding to the components.

2. The method of claim 1, wherein the performance metric for a child component characterizes one or more of the following:
   a task-processing time; a count or percentage of task completions; an intake number; a resource power state; a processor usage; a processor speed; a memory usage; a network usage; an occurrence of memory swapping; an occurrence of memory ballooning; an occurrence of an error; a task migration variable; a processing-power allocation; and a memory allocation.

3. The method of claim 1, wherein the display of the representation of the subset of the computing environment includes an indication of a performance state for each child component.

4. The method of claim 1, wherein a user selects the parent component through a user interface.

5. The method of claim 1, wherein the child-component state criterion includes thresholds separating ranges of values for performance states.

6. The method of claim 1, further comprising generating the parent-component state criterion based on user input.

7. The method of claim 1, further comprising generating the child-component state criterion based on user input.

8. A system, comprising:
   one or more data processors; and
   a non-transitory computer readable storage medium containing instructions which when executed on the one or more data processors cause the one or more data processors to perform actions including:
   causing display of a representation of a subset of components of a computing environment, wherein components of the computing environment include at least one cluster comprising at least one high level machine and a plurality of low level machines, wherein the representation depicts hierarchical relationships between user-selectable components corresponding to at least a subset of the components in the computing environment;
   upon receiving a selection of a component determined to be a parent component having at least one child component in the computing environment:
   determining a performance metric for each child component of the parent component wherein the performance metric for the child component indicates a performance of the child component;

determining a performance state for each child component of the parent component based on the performance metric for the child component and a child-component state criterion, wherein the child-component state criterion associates each of a plurality of performance states with separate range of values of the performance metric for the child component;

determining a parent state for the parent component based on performance states of the associated child components and a parent-component state criterion, wherein the parent-component state criterion associates the parent state with a particular performance state based on a threshold percentage or number of the associated child components that have the particular performance state; and causing display of an indication of the state of the parent component wherein if the display does not include a representation of the associated child components, causing display of the associated child components, indications of their performance states, and their hierarchical relationship to the selected parent component, wherein the computing environment is modified using the display of the representation of the subset of the computing environment by moving, adding or removing the user-selectable components corresponding to the components.

9. The system of claim 8, wherein the performance metric for a child component characterizes one or more of the following:

a task-processing time; a count or percentage of task completions; an intake number, a resource power state; a processor usage; a processor speed; a memory usage; a network usage; an occurrence of memory swapping; an occurrence of memory ballooning; an occurrence of an error; a task migration variable; a processing-power allocation; and a memory allocation.

10. The system of claim 8, wherein the display of the representation of the subset of the computing environment includes an indication of a performance state for each child component.

11. The system of claim 8, wherein a user selects the parent component through a user interface.

12. The system of claim 8, wherein the child-component state criterion includes thresholds separating ranges of values for performance states.

13. The system of claim 8, wherein the actions further include generating the parent-component state criterion based on user input.

14. The system of claim 8, wherein the actions further include generating the child component state criterion based on user input.

15. A computer-program product tangibly embodied in a non-transitory machine-readable storage medium, including instructions configured to cause one or more data processors to perform actions including:

causing display of a representation of a subset of components of a computing environment, wherein components of the computing environment include at least one cluster comprising at least one high level machine and a plurality of low level machines, wherein the representation depicts hierarchical relationships between user-selectable components corresponding to at least a subset of the components in the computing environment;

upon receiving a selection of a component determined to be a parent component having at least one child component in the computing environment:

determining a performance metric for each child component of the parent component wherein the performance metric for the child component indicates a performance of the child component;

determining a performance state for each child component of the parent component based on the performance metric for the child component and a child-component state criterion, wherein the child-component state criterion associates each of a plurality of performance states with separate range of values of the performance metric for the child component;

determining a parent state for the parent component based on performance states of the associated child components and a parent-component state criterion, wherein the parent-component state criterion associates the parent state with a particular performance state based on a threshold percentage or number of the associated child components that have the particular performance state; and causing display of an indication of the state of the parent component wherein if the display does not include a representation of the associated child components, causing display of the associated child components, indications of their performance states, and their hierarchical relationship to the selected parent component, wherein the computing environment is modified using the display of the representation of the subset of the computing environment by moving, adding or removing the user-selectable components corresponding to the components.

16. The computer-program product of claim 15, wherein the performance metric for a child component characterizes one or more of the following:

a task-processing time; a count or percentage of task completions; an intake number; a resource power state; a processor usage; a processor speed; a memory usage; a network usage; an occurrence of memory swapping; an occurrence of memory ballooning; an occurrence of an error; a task migration variable; a processing-power allocation; and a memory allocation.

17. The computer-program product of claim 15, wherein the actions further include causing display of an indication of a performance state for a child component.

18. The computer-program product of claim 17, wherein a user selects the parent component through a user interface.

19. The computer-program product of claim 15, wherein the child-component state criterion includes thresholds separating ranges of values for performance states.

20. The computer-program product of claim 15, wherein the actions further include generating the parent-component state criterion based on user input.

* * * * *